(12) United States Patent
Saito et al.

(10) Patent No.: US 11,068,652 B2
(45) Date of Patent: Jul. 20, 2021

(54) INFORMATION PROCESSING DEVICE

(71) Applicant: Mitsubishi Electric Corporation, Tokyo (JP)

(72) Inventors: Tatsuhiko Saito, Tokyo (JP); Yusuke Koji, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 189 days.

(21) Appl. No.: 16/339,990

(22) PCT Filed: Nov. 4, 2016

(86) PCT No.: PCT/JP2016/082793
§ 371 (c)(1),
(2) Date: Apr. 5, 2019

(87) PCT Pub. No.: WO2018/083777
PCT Pub. Date: May 11, 2018

(65) Prior Publication Data
US 2020/0042592 A1  Feb. 6, 2020

(51) Int. Cl.
*G06F 40/268* (2020.01)
*G06F 40/211* (2020.01)
(Continued)

(52) U.S. Cl.
CPC .......... *G06F 40/268* (2020.01); *G06F 40/211* (2020.01); *G06F 40/242* (2020.01); *G06F 16/345* (2019.01); *G06F 40/205* (2020.01)

(58) Field of Classification Search
CPC ..... G06F 40/205; G06F 40/268; G06F 16/345
See application file for complete search history.

(56) References Cited

U.S. PATENT DOCUMENTS

| 8,335,786 B2 * | 12/2012 | Pereira | G06K 9/00758 |
| | | | 707/728 |
| 2012/0163707 A1 * | 6/2012 | Baker | G06K 9/00456 |
| | | | 382/159 |

(Continued)

FOREIGN PATENT DOCUMENTS

| CN | 105760507 A | * | 7/2016 | |
| EP | 0266001 A2 | * | 5/1988 | ........... G06F 40/205 |

(Continued)

OTHER PUBLICATIONS

Islam, Aminul; Inkpen, Diana. Semantic text similarity using corpus-based word similarity and string similarity. ACM Transactions on Knowledge Discovery from Data (TKDD), 2008, 2nd edition, No. 2, pp. 1-25.

(Continued)

*Primary Examiner* — Feng-Tzer Tzeng
(74) *Attorney, Agent, or Firm* — Birch, Stewart, Kolasch & Birch, LLP

(57) ABSTRACT

An information processing device (10) includes: a morphological analysis unit (11a, 11b) performing morphological analysis to divide each of an article body text included in an article and a caption of each of images into morphemes; a phrase acquiring unit (12) dividing the article body text into phrases on a basis of a result of the morphological analysis performed by the morphological analysis unit (11b); and a correspondence determining unit (13). The correspondence determining unit (13) determines correspondence between each of the phrases of the article body text and the images by calculating a correlation between the caption and each of the phrases of the article body text on a basis of the result of the morphological analysis performed by the morphological analysis unit (11a).

6 Claims, 22 Drawing Sheets

(51) Int. Cl.
*G06F 40/242* (2020.01)
*G06F 40/205* (2020.01)
*G06F 16/34* (2019.01)

(56) References Cited

U.S. PATENT DOCUMENTS

| | | | | |
|---|---|---|---|---|
| 2013/0174010 A1* | 7/2013 | Le Chevalier | ........ | G06F 40/154 715/234 |
| 2014/0195897 A1* | 7/2014 | Balinsky | ............... | G06F 16/345 715/254 |
| 2016/0007054 A1* | 1/2016 | Polumbus | ............. | G06F 16/683 725/116 |

FOREIGN PATENT DOCUMENTS

| | | |
|---|---|---|
| JP | 2011-113289 A | 6/2011 |
| JP | 2012-185567 A | 9/2012 |
| JP | 2015-194919 A | 11/2015 |
| JP | 2016-167148 A | 9/2016 |
| WO | WO-2014158966 A1 * | 10/2014 ......... G06F 16/3334 |

OTHER PUBLICATIONS

Luong, Minh-Thang; Socher, Richard; Manning, Christopher D. Better word representations with recursive neural networks for morphology. in: Proceedings of the Seventeenth Conference on Computational Natural Language Learning, 2013, pp. 104-113.

Office Action issued in corresponding German Application No. 11 2016 007 323.2 dated Feb. 28, 2020.

Bird et al., "Natural Language Processing with Python", pp. 498-499, O'Reilly Japan, Nov. 8, 2010.

International Search Report for PCT/JP2016/082793 (PCT/ISA/210) dated Jan. 31, 2017.

* cited by examiner

FIG. 4

Article Body Text

Yamada Taro shi no jishoku ni tomonau ken chiji sen no kozu ga katamat te ki ta (The structure of confrontation in election of prefectural governor accompanying the resignation of Mr. Taro Yamada has settled).
Minshuto kenren o hihan shi nagara shutsuba hyomei shi ta doto syuin giin no Sato Hanako moto Boeisho ni taishi, zen ken chiji de Somusho mo tsutome ta Suzuki Ichiro shi ga 20 nichi ni ketsui o shimeshi, do kenren ga suisen suru mitoshi (It is expected that in opposition to Former Defense Minister Hanako Sato who is a Lower House member of the Minshu party and who has announced her candidacy while criticizing the prefectural federation of the Minshu party, Mr. Ichiro Suzuki who is a former prefectural governor and also served as a Minister of Internal Affairs and Communications will make a decision on the 20th, and the prefectural federation will recommend him).

Images and Captions

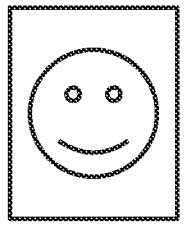 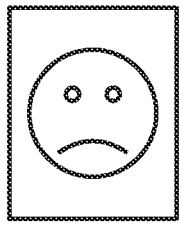 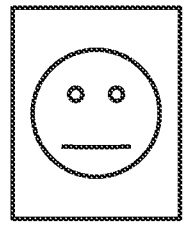

Yamada Taro shi
(Mr. Taro Yamada)

Sato Hanako
moto Boeisho
(Hanako Sato,
Former Defense
Minister)

Suzuki Ichiro
moto Somusho
(Ichiro Suzuki,
Former Minister of
Internal Affairs and
Communications)

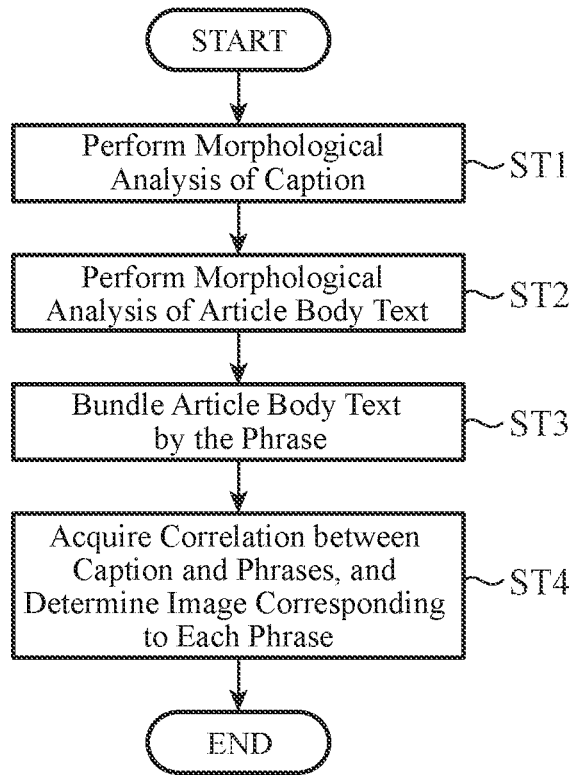
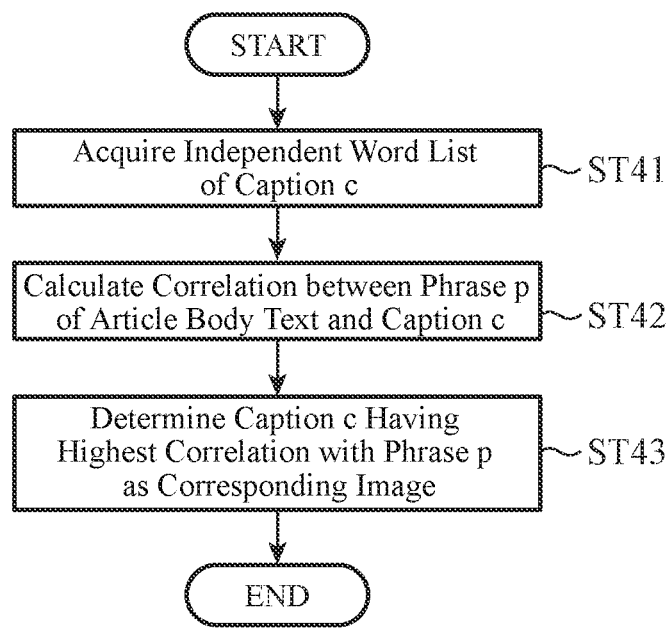

FIG. 7

| | Yamada/Taro/shi/no | jishoku/ni | tomonau | ken/chiji/sen/no | kozu/ga | katamat/te/ki/ta/ |
|---|---|---|---|---|---|---|
| Yamada/Taro/shi | 3 | 0 | 0 | 0 | 0 | 0 |
| Sato/Hanako/moto/Boeisho | 0 | 0 | 0 | 0 | 0 | 0 |
| Suzuki/Ichiro/moto/Somusho | 0 | 0 | 0 | 0 | 0 | 0 |

| | Minshuto/kenren/o | hihan/shi/nagara | shutsuba/hyomei/shi/ta | doto/shuin/giin/no | Sato/Hanako/moto/Boeisho/ni/taishi/ |
|---|---|---|---|---|---|
| Yamada/Taro/shi | 0 | 0 | 0 | 0 | 0 |
| Sato/Hanako/moto/Boeisho | 0 | 0 | 0 | 0 | 4 |
| Suzuki/Ichiro/moto/Somusho | 0 | 0 | 0 | 0 | 1 |

| | zen/ken/chiji/de | Somusho/mo | tsutome/ta | Suzuki/Ichiro/shi/ga | 20/nichi/ni | ketsui/o | shimeshi/; do/kenren/ga | suisen/suru | mitoshi/ |
|---|---|---|---|---|---|---|---|---|---|
| Yamada/Taro/shi | 0 | 0 | 0 | 1 | 0 | 0 | 0 | 0 | 0 |
| Sato/Hanako/moto/Boeisho | 0 | 0 | 0 | 0 | 0 | 0 | 0 | 0 | 0 |
| Suzuki/Ichiro/moto/Somusho | 1 | 0 | 0 | 2 | 0 | 0 | 0 | 0 | 0 |

FIG. 10

Article Body Text

Ofuna Kosan no Mitsubishi Taro shacho wa 11 nichi, do sha sogyoke no Kato Saburo kaicho to kaidan shi ta (Taro Mitsubishi, President of Ofuna Kosan, met Chairman Saburo Kato in the company's founding family on the 11th).
Sogyoke gawa wa gappei o tekkai subeki da to no jurai no shucho o kaezu, kyogi wa heikosen ni owat ta (The founding family did not change their previous insistence that the merger should be withdrawn, and the consultation has failed to reach an agreement).

Images and captions

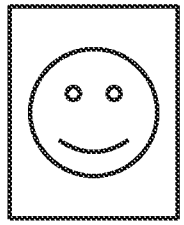

Ofuna Kosan keiei jin to no kyogi go, kisha dan no shuzai ni oji ru sogyoke gawa dairinin no Saito Jiro bengoshi (Lawyer Jiro Saito representing for the founding family who accepted an interview with the press corps after the consultation with the Ofuna Kosan management)

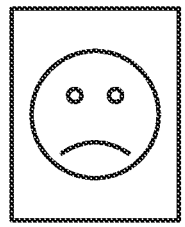

Sogyoke gawa to no kaidan go, kisha kaiken de kibishii hyojo o mise ru Mitsubishi Taro shacho (President Taro Mitsubishi who showed serious facial expression at the press interview after the meeting with the founding family)

FIG. 11

| | Ofuna/Kosan/no | Mitsubishi/Taro/shacho/wa | 11/nichi/, | do/sha/sogyoke/no | Kato/Saburo/kaicho/to | kaidan/shi/ta/. |
|---|---|---|---|---|---|---|
| Ofuna/Kosan/keiei/jin/to/no/kyogi/go/,/kisha/dan/no/shuzai/ni/oji/ru/sogyoke/gawa/dairinin/no/Saito/Jiro/bengoshi | 2 | 0 | 0 | 1 | 0 | 0 |
| sogyoke/gawa/to/no/kaidan/go/,/kisha/kaiken/de/kibishii/hyojo/o/mise/ru/Mitsubishi/Taro/shacho | 0 | 3 | 0 | 1 | 0 | 0 |

FIG. 12

| | Ofuna/Kosan/no | Mitsubishi/Taro/shacho/wa | 11/nichi/ | do/sha/sogyoke/no | Kato/Saburo/kaicho/to | kaidan/shi/ta/ |
|---|---|---|---|---|---|---|
| Saito/Jiro/bengoshi | ○ | ○ | | | | |
| Mitsubishi/Taro/shacho | ○ | ▨ | ○ | ○ | ○ | ○ |

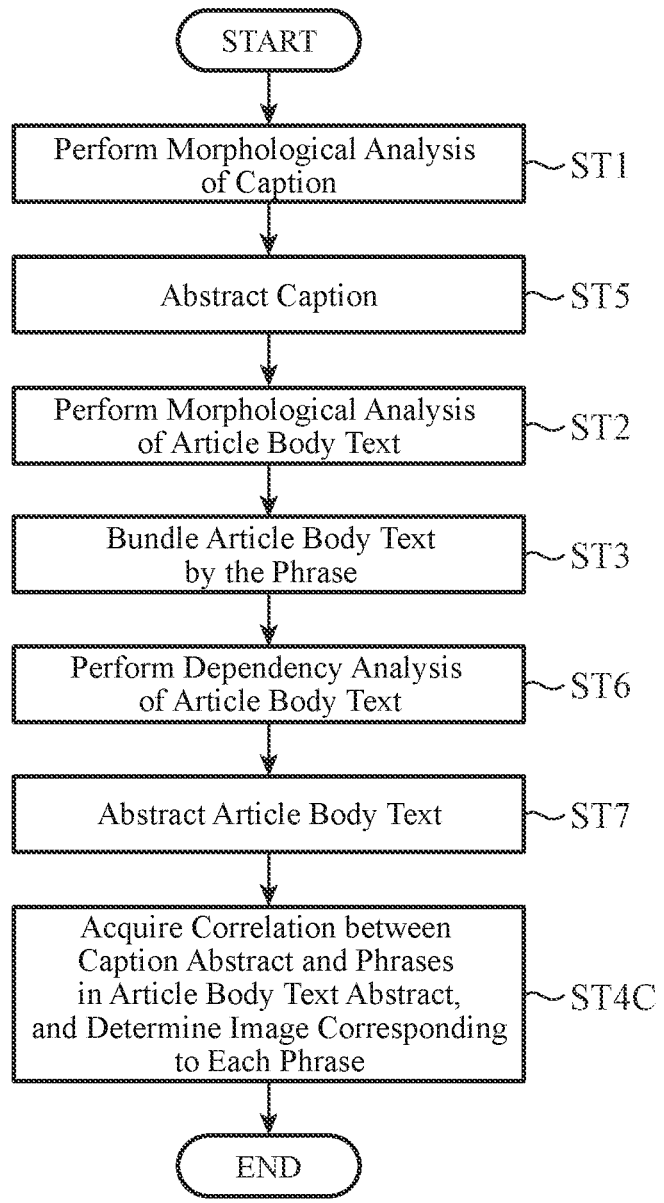

FIG. 18

Article Body Text

Yamada Taro shi no jishoku ni tomonau ken chiji sen no kozu ga katamat te ki ta (The structure of confrontation in election of prefectural governor accompanying the resignation of Mr. Taro Yamada has settled).
Minshuto kenren o hihan shi nagara shutsuba hyomei shi ta doto syuin giin no Sato Hanako moto Boeisho ni taishi, zen ken chiji de Somusho mo tsutome ta Suzuki Ichiro shi ga 20 nichi ni ketsui o shimeshi, do kenren ga suisen suru mitoshi (It is expected that in opposition to Former Defense Minister Hanako Sato who is a Lower House member of the Minshu party and who has announced her candidacy while criticizing the prefectural federation of the Minshu party, Mr. Ichiro Suzuki who is a former prefectural governor and also served as a Minister of Internal Affairs and Communications will make a decision on the 20th, and the prefectural federation will recommend him).
Bengoshi no Tanaka Taro shi ga 11 nichi ni kisha kaiken shi te shutsuba hyomei suru (Mr. Taro Tanaka who is a lawyer will give a press conference and announce his candidacy on the 11th).
Haiyu no Kamakura Taro shi mo iyoku o simeshi te iru (Mr. Taro Kamakura who is an actor showed his willingness).

Images and captions

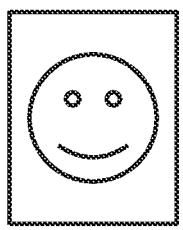
Yamada Taro shi
(Mr. Taro Yamada)

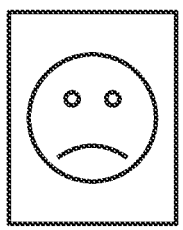
Sato Hanako
moto Boeisho
(Hanako Sato,
Former Defense
Minister)

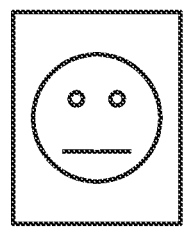
Suzuki Ichiro
moto Somusho
(Ichiro Suzuki,
Former Minister of
Internal Affairs and
Communications)

| | Word Significance Degree |
|---|---|
| Sato Hanako | 6 |
| Suzuki Ichiro | 2 |

INFORMATION PROCESSING DEVICE

TECHNICAL FIELD

The present invention relates to an information processing device and an information processing method for processing information.

BACKGROUND ART

Many applications that display a text or article of news or a blog on a screen have been put in practical use. For example, a news application that displays news on a screen of a car navigation system, a display in an elevator, or a smartphone are used.

In an article displayed by the above-mentioned application, an image is attached as supplementary information in many cases. Further, a caption explaining the content of the image may be attached to the image.

The attachment of an image to an article makes it easier for the user to understand the content of the article. On the other hand, a problem is that, when an image corresponding to neither a sentence displayed on the screen nor a sentence being currently read out is displayed, the user gets confused and the content of the sentence is difficult to be understood.

For example, in a case in which multiple images are attached to an article, if all the images are displayed similarly, it is difficult to understand for which image the sentence currently displayed on the screen or read out provides an explanation. Further, in a case in which the display area of the screen is small, like that of a smartphone, and only one of multiple images can be displayed, it is necessary to display an image corresponding to the sentence currently being displayed on the screen or read out.

An example of technique for selecting an image matching a document is described in Patent Literature 1. In a document decoration supporting system of Patent Literature 1, a document is analyzed, characteristic words are extracted, evaluation values for template images are calculated, and the template images are displayed in descending order of their evaluation values.

Further, an example of technique for emphasizing a sentence currently being read out is described in Patent Literature 2. A display control device of Patent Literature 2 extracts text areas including a text from display data, calculates a correlation between the inside of each of the text areas and each writing element included in writing data to be read out, to determine correspondence between the text area and the writing element, and emphatically displays the text area corresponding to the writing element about which voice data is outputted.

CITATION LIST

Patent Literature

Patent Literature 1: Japanese Unexamined Patent Application Publication No. 2011-113289
Patent Literature 2: Japanese Unexamined Patent Application Publication No. 2012-185567

SUMMARY OF INVENTION

Technical Problem

In above-mentioned Patent Literatures 1 and 2, correspondence with an image is acquired for each input unit such as a document or a sentence. Therefore, a problem is that even though an application displays an article body text and an image on the screen using the technique described in Patent Literature 1, when multiple images are provided for a single article, the article body text and the image, which are currently displayed on the screen, do not correspond to each other. Similarly, a problem is that even though an application displays an image while reading out an article body text using the technique described in Patent Literature 2, when multiple images are provided for a single article, the article body text currently being read out and the image displayed on the screen do not correspond to each other.

The present invention is made in order to solve the above problems, and it is therefore an object of the present invention to provide technique for correctly determining correspondence between an article body text displayed on a screen or read out and an image displayed on the screen.

Solution to Problem

An information processing device according to the present invention includes: a processor to execute a program; and a memory to store the program which, when executed by the processor, performs processes of, performing morphological analysis to divide each of an article body text included in an article and a caption of each of images into morphemes; dividing the article body text into phrases on a basis of a result of the morphological analysis; generating a caption abstract by abstracting the caption; and determining correspondence between each of the phrases of the article body text and the images by calculating a correlation between the caption abstract and each of the phrases of the article body text on a basis of the result of the morphological analysis.

Advantageous Effects of Invention

According to the present invention, because a correlation between a caption and each of the phrases of an article body text is calculated and correspondence between each of the phrases of the article body text and an image is determined, correspondence between an article body text displayed on a screen or read out and an image displayed on the screen can be determined correctly.

BRIEF DESCRIPTION OF DRAWINGS

FIG. 4 is a view showing an example of an article to be processed by the information processing device according to Embodiment 1 of the present invention;

FIG. 5 is a flowchart showing operation of the information processing device according to Embodiment 1 of the present invention;

FIG. 6 is a flowchart showing the details of step ST4 of FIG. 5;

FIG. 7 is a table showing the number of matching independent words between each phrase and each caption in Embodiment 1 of the present invention;

FIG. 10 is a view showing an example of an article to be processed by the information processing device according to Embodiment 2 of the present invention;

FIG. 11 is a table showing the number of matching independent words between each phrase and each caption in a case in which the article of FIG. 10 is processed by the information processing device according to Embodiment 1 of the present invention;

FIG. 12 is a table showing the number of matching independent words between each phrase and each caption in a case in which the article of FIG. 10 is processed by the information processing device according to Embodiment 2 of the present invention;

FIG. 17 is a flowchart showing operation of the information processing device according to Embodiment 4 of the present invention;

FIG. 18 is a view showing an example of an article to be processed by the information processing device according to Embodiment 4 of the present invention, and an article body text abstract generated by a body text abstracting unit;

DESCRIPTION OF EMBODIMENTS

Hereafter, in order to explain the present invention in more detail, some embodiments of the invention will be described with reference to the accompanying drawings.

Embodiment 1

Figure 1:
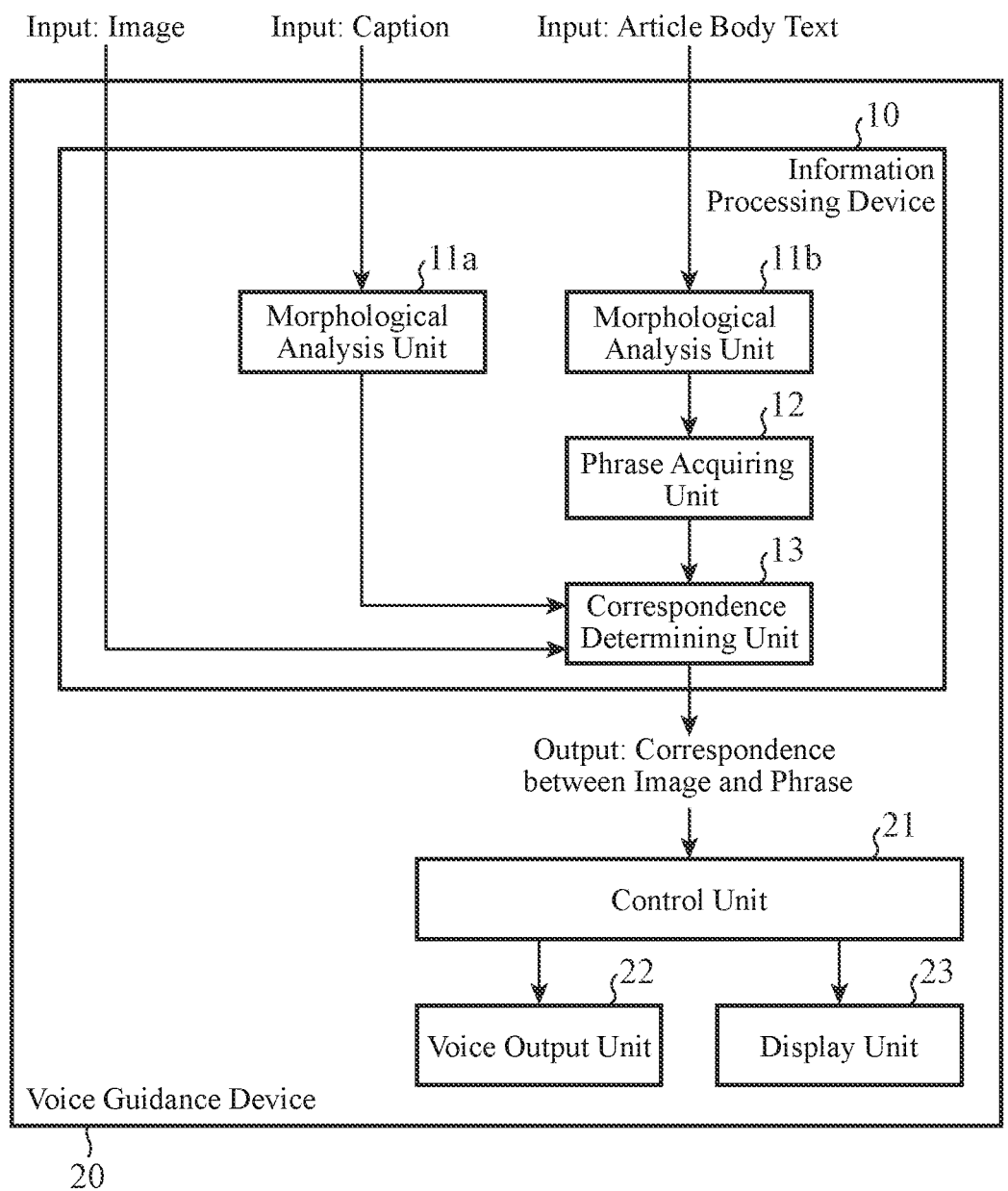
FIG. 1 is a block diagram showing an example of a configuration of a voice guidance device employing an information processing device according to Embodiment 1 of the present invention.

FIG. 1 is a block diagram showing an example of a configuration of a voice guidance device 20 employing an information processing device 10 according to Embodiment 1 of the present invention. The information processing device 10 includes a morphological analysis unit 11a, a morphological analysis unit 11b, a phrase acquiring unit 12, and a correspondence determining unit 13. In the example of FIG. 1, the information processing device 10 is configured integrally with the voice guidance device 20. The voice guidance device 20 includes the information processing device 10, a control unit 21, a voice output unit 22, and a display unit 23.

Figure 2:
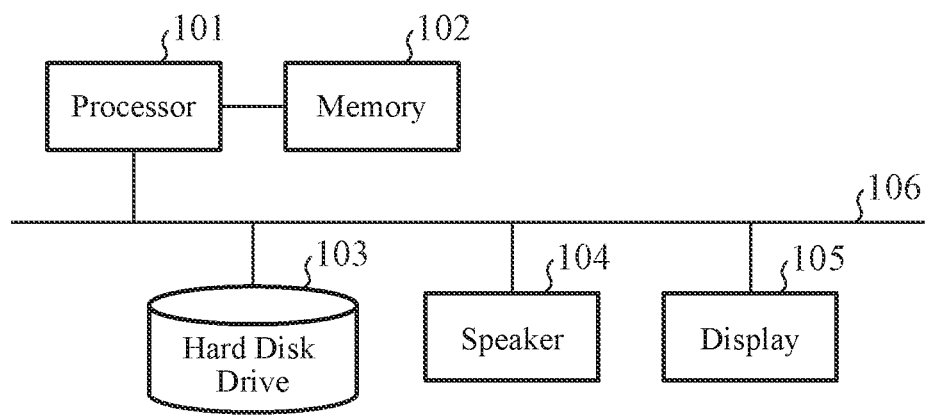
FIG. 2 is a view showing an example of a hardware configuration of the voice guidance device employing the information processing device according to Embodiment 1 of the present invention.
Figure 3:
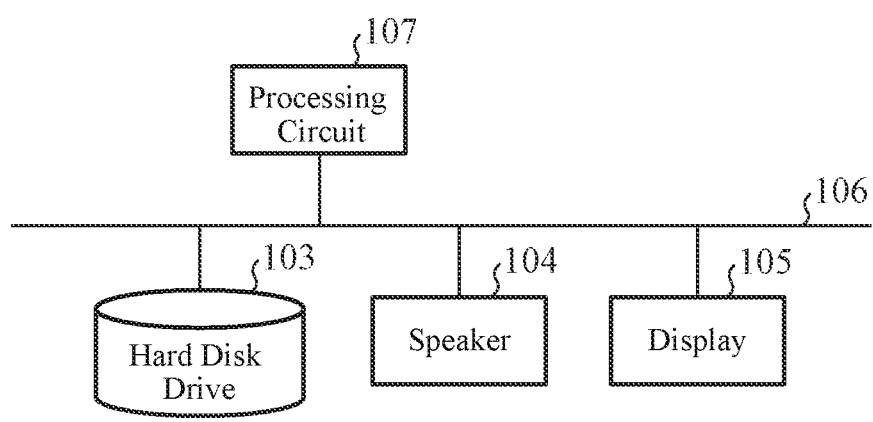
FIG. 3 is a view showing another example of a hardware configuration of the voice guidance device employing the information processing device according to Embodiment 1 of the present invention.

FIGS. 2 and 3 are views showing examples of a hardware configuration of the voice guidance device 20 employing the information processing device 10 according to Embodiment 1 of the present invention. Each of the functions of the morphological analysis unit 11a, the morphological analysis unit 11b, the phrase acquiring unit 12, the correspondence determining unit 13, and the control unit 21 in the voice guidance device 20 is implemented by a processing circuit. Namely, the voice guidance device 20 includes a processing circuit for implementing each of the above-mentioned functions. The processing circuit may be a processor 101 that executes a program stored in a memory 102, or may be a processing circuit 107 as dedicated hardware.

In the case in which the processing circuit is the processor 101, as shown in FIG. 2, each of the functions of the morphological analysis unit 11a, the morphological analysis unit 11b, the phrase acquiring unit 12, the correspondence determining unit 13, and the control unit 21 is implemented by software, firmware, or a combination of software and firmware. Software or firmware is described as a program and the program is stored in the memory 102. As an alternative, the program may be stored in a hard disk drive 103. The processor 101 implements the function of each of the units by reading and executing the program stored in the memory 102. Namely, the voice guidance device 20 includes the memory 102 for storing a program by which steps shown in a flowchart of FIG. 5 or the like described later are performed as a result when the program is executed by the processor 101. Further, it can be said that this program causes a computer to perform procedures or methods which the morphological analysis unit 11a, the morphological analysis unit 11b, the phrase acquiring unit 12, the correspondence determining unit 13, and the control unit 21 implement.

Here, the processor 101 is a Central Processing Unit (CPU), a processing device, an arithmetic device, a microprocessor, a microcomputer, or the like.

The memory 102 may be a non-volatile or volatile semiconductor memory, such as a Random Access Memory (RAM), a Read Only Memory (ROM), an Erasable Programmable ROM (EPROM), or a flash memory, or may be an optical disc, such as a Compact Disc (CD) or a Digital Versatile Disc (DVD).

In the case in which the processing circuit is hardware for dedicated use as shown in FIG. 3, the processing circuit 107 is, for example, a single circuit, a composite circuit, a programmable processor, a parallel programmable processor, an Application Specific Integrated Circuit (ASIC), a Field Programmable Gate Array (FPGA), or a combination of these circuits. The functions of the morphological analysis unit 11a, the morphological analysis unit 11b, the phrase acquiring unit 12, the correspondence determining unit 13, and the control unit 21 may be implemented by multiple processing circuits 107, or the functions of these units may be implemented collectively by a single processing circuit 107.

Some part of the functions of the morphological analysis unit 11a, the morphological analysis unit 11b, the phrase acquiring unit 12, the correspondence determining unit 13, and the control unit 21 may be implemented by software or firmware, and some part of them may be implemented by hardware for dedicated use. In this way, the processing circuit in the voice guidance device 20 can implement each of the above-mentioned functions using software, firmware, hardware, or a combination of software, firmware, and hardware.

The voice output unit 22 in the voice guidance device 20 is a speaker 104. The display unit 23 in the voice guidance device 20 is a display 105. The processor 101 or the processing circuit 107, the hard disk drive 103, the speaker 104, and the display 105 are connected via a bus 106 or the like in such a way that transmitting and receiving of information can be performed.

Next, operation of the voice guidance device 20 employing the information processing device 10 will be explained.

FIG. 4 is a view showing an example of an article to be processed by the information processing device 10 according to Embodiment 1 of the present invention. The article includes pieces of information about an article body text, images, and captions. A caption is a sentence explaining the content of an image with which the caption is paired.

FIG. 5 is a flowchart showing operation of the information processing device 10 according to Embodiment 1 of the present invention. Hereafter, a case in which the pieces of information of the article shown in FIG. 4 are inputted to the information processing device 10 is assumed.

In step ST1, the morphological analysis unit 11a performs morphological analysis of each caption to divide the caption into morphemes, and acquires a reading which are assigned to each of the morphemes and a part of speech of each of the morpheme.

In step ST2, the morphological analysis unit 11b performs morphological analysis of the article body text, to divide the article body text into morphemes, and acquires a reading which are assigned to each of the morphemes and a part of speech of each of the morpheme.

In step ST3, the phrase acquiring unit 12 divides the article body text into phrases on the basis of a result of the morphological analysis of the article body text, the result being acquired by the morphological analysis unit 11b. More specifically, the phrase acquiring unit 12 determines whether each of the morphemes of the article body text is an independent word or a dependent word in consideration of the part of speech and the conjugation, and acquires phrases each of which is a combination of morphemes. According to a very simplified definition, a phrase has a form in which zero or more dependent words succeed a sequence of one or more independent words. The processing performed by the phrase acquiring unit 12 can be implemented using technique described in, for example, "Nyumon Shizen Gengo Shori (Natural Language Processing with Python)" (Steven Bird et al. 4th Edition, O'Reilly Japan, Jan. 17, 2012, pp. 498-499).

In step ST4, the correspondence determining unit 13 calculates a correlation between each caption and each of the phrases of the article body text on the basis of a result of the morphological analysis of the caption, the result being acquired by the morphological analysis unit 11a, and the phrases of the article body text which are acquired by the phrase acquiring unit 12, thereby determining correspondence between each of the phrases of the article body text and an image. More specifically, the correspondence determining unit 13 calculates a correlation between each of the phrases of the article body text and each caption, and determines the image corresponding to a caption having the highest correlation with the phrase as an image corresponding to a phrase.

Next, details of step ST4 will be explained.

FIG. 6 is a flowchart showing the details of step ST4 of FIG. 5. Here, a caption attached to one of the multiple images included in the article is referred to as a caption c. Further, one of the multiple phrases included in the article body text is referred to as a phrase p.

In step ST41, the correspondence determining unit 13 acquires independent words in the caption c on the basis of the part of speech of the caption c, the part of speech being determined by the morphological analysis unit 11a, and generates an independent word list. There are various methods for acquiring independent words. For example, the correspondence determining unit 13 may acquire all morphemes excluding stop words (postpositional particles and auxiliary verbs) as independent words, or may acquire only nouns as independent words.

In step ST42, the correspondence determining unit 13 calculates a correlation between the phrase p of the article body text and the caption c. There are various methods for calculating the correlation. For example, the correspondence determining unit 13 acquires a correlation between the phrase p and the caption c on the basis of how many words in the independent word list of the caption c the phrase p includes.

In step ST43, the correspondence determining unit 13 determines the caption c having the highest correlation with the phrase p as a corresponding image. The correspondence determining unit 13 then outputs the correspondence between the phrase and the image.

FIG. 7 is a table showing the number of matching independent words between each phrase and each caption in Embodiment 1 of the present invention. "/" in each caption and "/" in each phrase show dividing positions each between morphemes. According to FIG. 7, the correlation of the phrase "Yamada/Taro/shi/no" with the caption "Yamada/Taro/shi" is "3", and is higher than the correlation "0" with each of the other captions "Sato/Hanako/moto/Boeisho" and "Suzuki/Ichiro/moto/Somusho." Therefore, as the image corresponding to the phrase "Yamada/Taro/shi/no", the image to which the caption "Yamada/Taro/shi" is attached is the most suitable.

As a method of calculating a correlation, in addition to the above-mentioned method, there are, for example, a method of calculating a value between each phrase and each caption, the value being referred to as the Levenshtein distance or the edit distance, and a method of expressing each phrase and each caption as vectors using the word2vec method, and acquiring the similarity between the vectors.

The control unit 21 controls the voice output unit 22 and the display unit 23 to display, when a phrase of the article body text is read out, the image corresponding to the phrase, on the basis of correspondence between each image and each phrase, the correspondence being acquired by the correspondence determining unit 13. The voice output unit 22 reads out the article body text under the control of the control unit 21. The display unit 23 displays the image under the control of the control unit 21.

For example, during the time when the voice output unit 22 reads out "Yamada/Taro/shi/no" which is the first phrase of FIG. 7, the display unit 23 displays the image to which the caption "Yamada/Taro/shi" is attached. Next, during the time when the voice output unit 22 reads out the phrases from the second phrase "jishoku/ni" to the tenth phrase "doto/shuin/giin/no", the display unit 23 displays no image. Next, during the time when the voice output unit 22 reads out the eleventh phrase "Sato/Hanako/moto/Boeisho/ni/taishi/,", the display unit 23 displays the image to which the caption "Sato/Hanako/moto/Boeisho" is attached.

As an alternative, during the time when the voice output unit 22 reads out the phrases from the second phrase "jishoku/ni" to the tenth phrase "doto/shuin/giin/no", the display unit 23 may continue displaying the image to which the caption "Yamada/Taro/shi" corresponding to the first phrase "Yamada/Taro/shi/no" is attached.

Although in Embodiment 1, the voice guidance device 20 is configured to read out the article body text, such voice reading is not necessarily required. For example, there can be provided a configuration in which the highlighting of each phrase, instead of the voice reading, is performed, and an image corresponding to the highlighted phrase is displayed. Further, there can be provided a configuration in which when a part of the article body text is displayed on the screen, an image corresponding to the part of the article body text currently being displayed is displayed or emphasized.

As described above, the information processing device 10 according to Embodiment 1 is configured to include: a morphological analysis unit 11a, 11b performing morphological analysis to divide each of an article body text included in an article and a caption of each of images into morphemes; a phrase acquiring unit 12 dividing the article body text into phrases on a basis of a result of the morphological analysis performed by the morphological analysis unit 11b; and a correspondence determining unit 13 determining correspondence between each of the phrases of the article body text and the images by calculating a correlation between the caption and each of the phrases of the article body text on a basis of the result of the morphological analysis performed by the morphological analysis unit 11a. As a result, correspondence between an article body text displayed on the screen or read out and an image displayed on the screen can be determined correctly.

Embodiment 2

Figure 8:
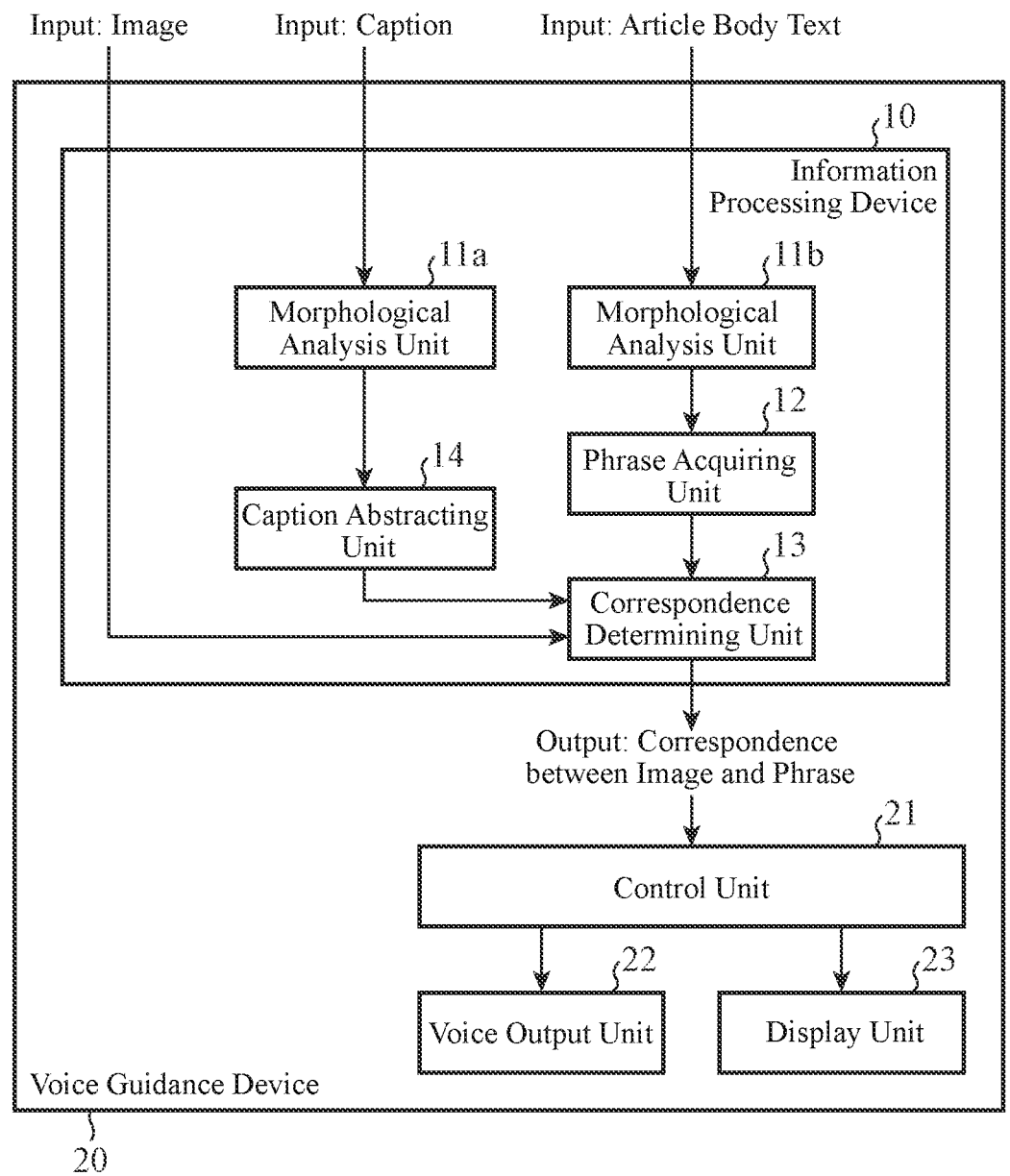
FIG. 8 is a block diagram showing an example of a configuration of a voice guidance device employing an information processing device according to Embodiment 2 of the present invention.

FIG. 8 is a block diagram showing an example of a configuration of a voice guidance device 20 employing an information processing device 10 according to Embodiment 2 of the present invention. The information processing device 10 according to Embodiment 2 has a configuration in which a caption abstracting unit 14 is added to the information processing device 10 of Embodiment 1 shown in FIG. 1. In FIG. 8, the same or corresponding components as those of FIG. 1 are denoted by the same reference signs, and an explanation of the components will be omitted hereafter.

The caption abstracting unit 14 is implemented by the processor 101 shown in FIG. 2 which executes a program stored in the memory 102. As an alternative, the caption abstracting unit 14 is implemented by the processing circuit 107 shown in FIG. 3.

Figure 9:
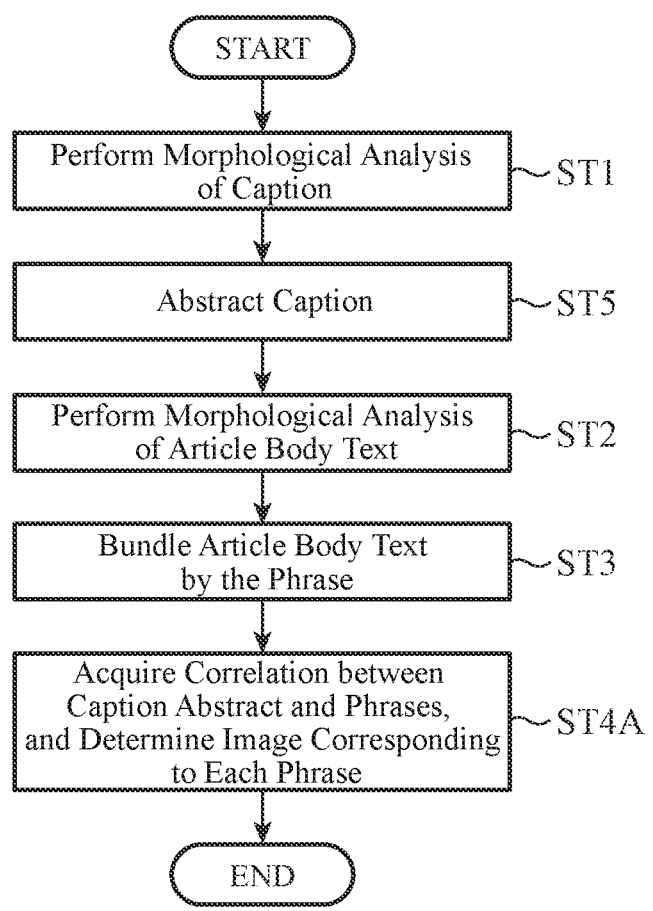
FIG. 9 is a flowchart showing operation of the information processing device according to Embodiment 2 of the present invention.

FIG. 9 is a flowchart showing operation of the information processing device 10 according to Embodiment 2 of the present invention. Because processes in steps ST1 to ST3 of FIG. 9 are the same as those in steps ST1 to ST3 of FIG. 5, the explanation of the steps will be omitted.

In step ST5 subsequent to step ST1, the caption abstracting unit 14 generates a caption abstract by abstracting each caption using information about a part of speech and so on, out of the result of the morphological analysis of the caption, the result being acquired by the morphological analysis unit 11a. As a method of abstracting a caption, there are various methods, such as a method of using a dependency structure and a method of using Term Frequency-Inverse Document Frequency (TF-IDF). The IDF is a value predetermined for each word and represents the frequency of appearance of the word. The TF is a value showing the frequency of appearance of a word within one article to be read out. The TF-IDF is calculated by multiplying the TF value and the IDF value.

Here, the caption abstracting unit 14 uses a method of extracting, as a caption abstract, a group of nouns being a last part of a caption on the basis of a result of morphological analysis of the caption. In particular, in a caption of an image in a news article or the like, a noun or noun phrase appears at the end thereof in many cases, which is a characteristic referred to as taigendome in Japanese, so that this method using such a characteristic is effective.

In step ST4A, a correspondence determining unit 13 calculates a correlation between the caption abstract acquired by the caption abstracting unit 14 and each of the phrases of an article body text, the phrases being acquired by a phrase acquiring unit 12, on the basis of the caption abstract and each of the phrases of the article body text, thereby determining correspondence between each of the phrases of the article body text and an image.

FIG. 10 is a view showing an example of an article to be processed by the information processing device 10 according to Embodiment 2 of the present invention. FIG. 11 is a table showing the number of matching independent words between each phrase and each caption in the case in which the information processing device 10 according to Embodiment 1 of the present invention processes the article of FIG. 10. FIG. 12 is a table showing the number of matching independent words between each phrase and each caption in the case in which the information processing device 10 according to Embodiment 2 of the present invention processes the article of FIG. 10.

In Embodiment 1, the correspondence determining unit 13 calculates a correlation using a result of morphological analysis of the whole of each caption. However, in the case of the article as shown in FIG. 10, when a caption which is a long sentence is used without any processing, the correlation cannot be calculated correctly. As shown in FIG. 11, even though an image shows "Saito Jiro bengoshi (lawyer Jiro Saito)", a correlation with "Ofuna Kosan" which is not related directly to the image is high, and as a result, the image to which the caption "Ofuna/Kosan/keiei/jin/to/no/kyogi/go/, /kisha/dan/no/shuzai/ni/oji/ru/sogyoke/gawa/ dairinin/no/Saito/Jiro/ben goshi" is attached is selected as the image corresponding to the phrase "Ofuna/Kosan/no."

On the other hand, in Embodiment 2, correlations are calculated using the caption abstracts acquired by abstracting the captions, as shown in FIG. 12. In FIG. 12, groups of nouns "Saito/Jiro/bengoshi" and "Mitsubishi/Taro/shacho" which appear at the ends of the captions, respectively, are extracted by the caption abstracting unit 14 as the caption abstracts. As a result, the calculation of a correlation between a noise part included in each caption and each of the phrases of the article body text is eliminated, and the determination of the correspondence is performed more appropriately.

As described above, the information processing device 10 according to Embodiment 2 is configured to include a caption abstracting unit generating a caption abstract by abstracting the caption. The correspondence determining unit determines correspondence between each of the phrases of the article body text and the images by calculating a correlation between the caption abstract and each of the phrases of the article body text. As a result, by generating an abstract of a caption, correspondence between an article body text displayed on the screen or read out and an image displayed on the screen can be determined correctly.

Embodiment 3

Figure 13:
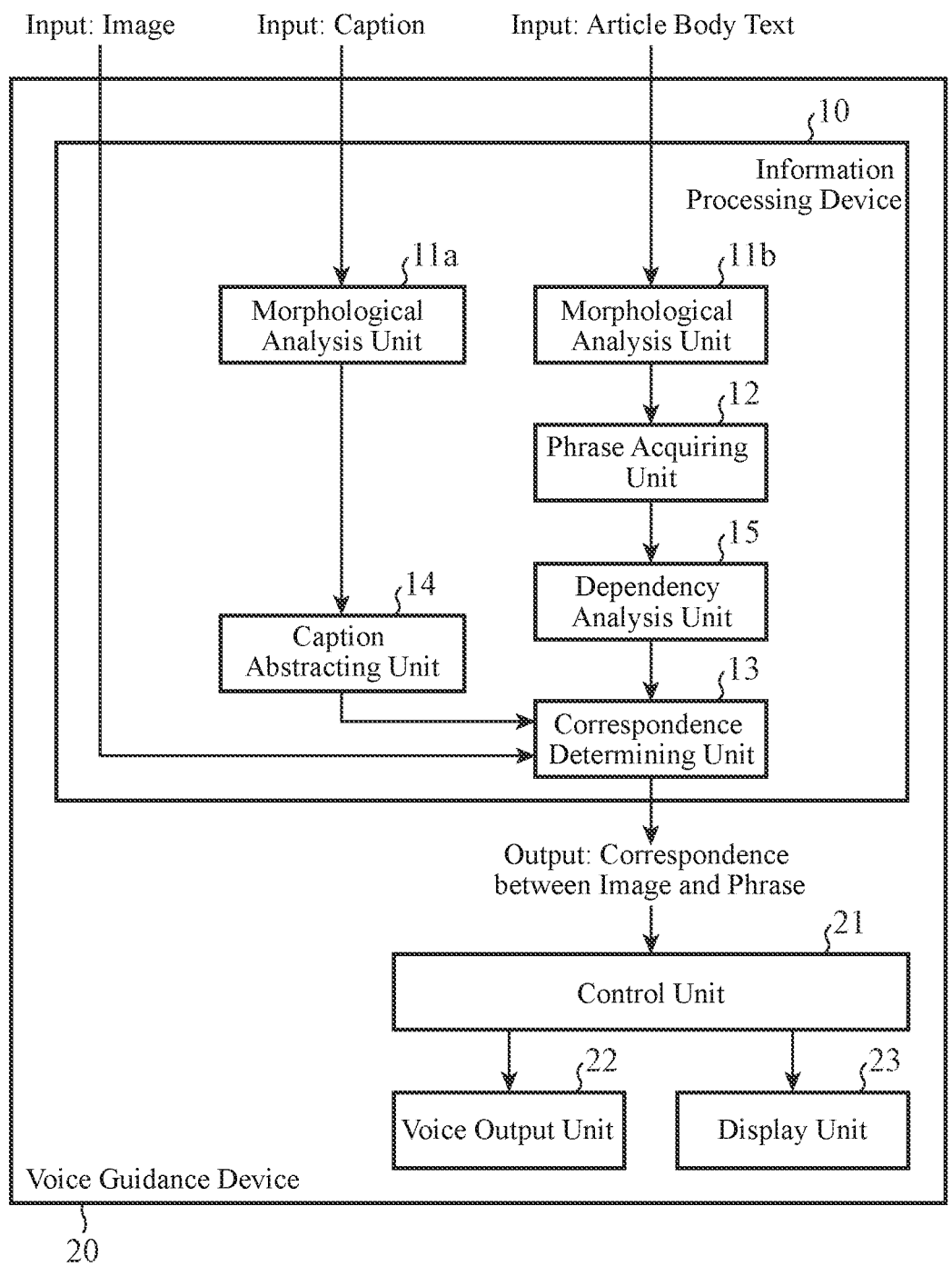
FIG. 13 is a block diagram showing an example of a configuration of a voice guidance device employing an information processing device according to Embodiment 3 of the present invention.

FIG. 13 is a block diagram showing an example of a configuration of a voice guidance device 20 employing an information processing device 10 according to Embodiment 3 of the present invention. The information processing device 10 according to Embodiment 3 has a configuration in which a dependency analysis unit 15 is added to the information processing device 10 of Embodiment 2 shown in FIG. 8. In FIG. 13, the same or corresponding components as those of FIG. 8 are denoted by the same reference signs, and an explanation of the components will be omitted hereafter.

The dependency analysis unit 15 is implemented by the processor 101 shown in FIG. 2 which executes a program stored in the memory 102. As an alternative, the dependency analysis unit 15 is implemented by the processing circuit 107 shown in FIG. 3.

Figure 14:
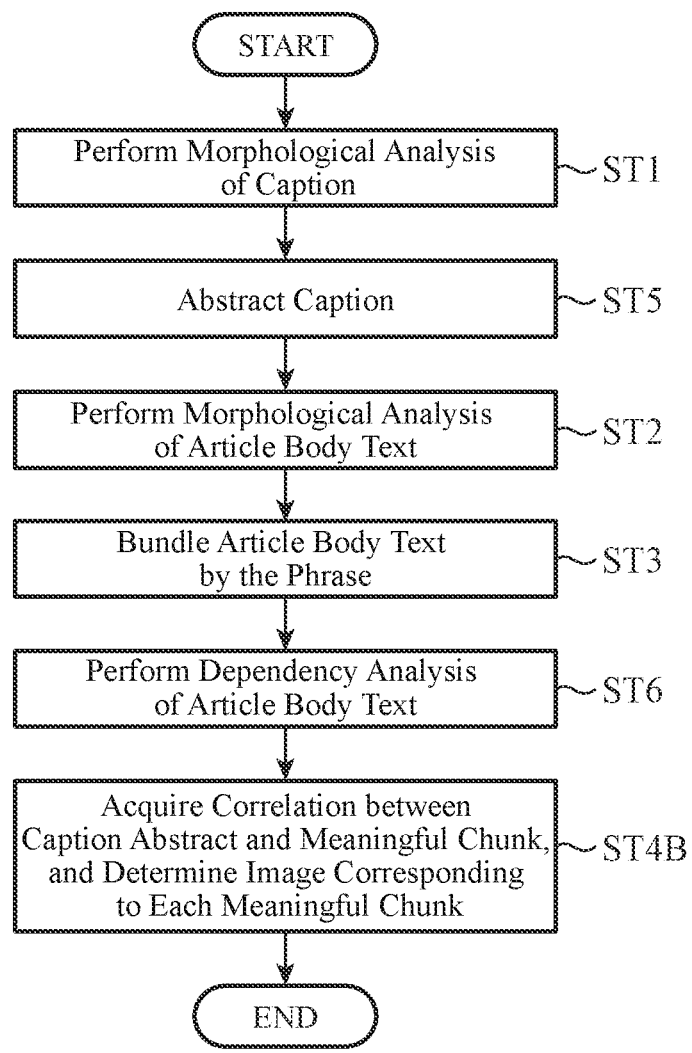
FIG. 14 is a flowchart showing operation of the information processing device according to Embodiment 3 of the present invention.

FIG. 14 is a flowchart showing operation of the information processing device 10 according to Embodiment 3 of the present invention. Because processes in steps ST1 to ST3, and ST5 of FIG. 14 are the same as those in steps ST1 to ST3, and ST5 of FIG. 9, an explanation of the steps will be omitted.

In step ST6 subsequent to step ST3, the dependency analysis unit 15 acquires a dependency relation between phrases of an article body text on the basis of the phrases acquired by a phrase acquiring unit 12, and divides the article body text into meaningful chunks.

In step ST4B, from caption abstracts acquired by a caption abstracting unit 14, and the meaningful chunks of the article body text which are acquired by the dependency analysis unit 15, a correspondence determining unit 13 calculates a correlation between each of the caption abstracts and each of the meaningful chunks of the article body text, thereby determining correspondence between each of the meaningful chunks of the article body text and an image.

Figure 15:
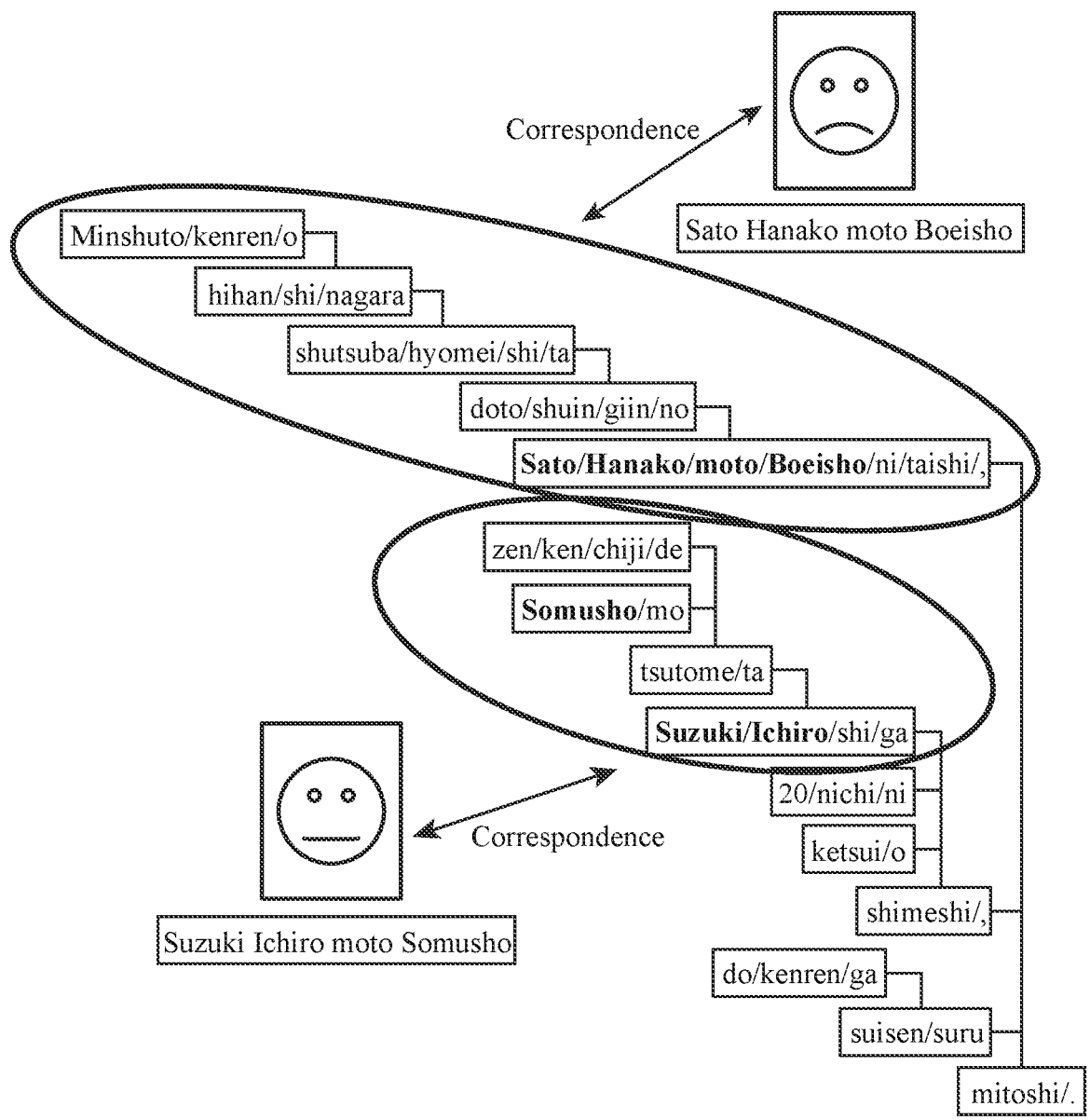
FIG. 15 is a view showing a result of dependency analysis of the article shown in FIG. 4 performed by a dependency analysis unit of the information processing device according to Embodiment 3 of the present invention.

FIG. 15 is a view showing a result of a dependency analysis of the article shown in FIG. 4 performed by the dependency analysis unit 15 of the information processing device 10 according to Embodiment 3 of the present invention. Hereafter, it is assumed that captions, which are not shown in the drawings, are abstracted to generate caption abstracts "Sato Hanako moto Boeisho (Former Defense Minister Hanako Sato)" and "Suzuki Ichiro mato Somusho (Former Internal Affairs and Communications Minister Ichiro Suzuki)".

The dependency analysis result has a tree structure in which the last phrase "mitoshi/." is the root thereof, and this structure is referred to as the dependency analysis tree. It is seen that when the correspondence determining unit 13 calculates a correlation between this dependency analysis tree and each of the caption abstracts, the following three phrases: "Sato/Hanako/moto/Boeisho/ni/taishi/,", "Somusho/mo", and "Suzuki/Ichiro/shi/ga" each including parts expressed in boldface type show high correlations. The correspondence determining unit 13 acquires a meaningful chunk which is a collection of phrases above each of the phrases having a high correlation in the dependency analysis tree, i.e., branches extending in a direction going away from the root, and as a result, can determine correspondence between the meaningful chunk and an image. In FIG. 15, the image to which the caption abstract "Sato Hanako moto Boeisho (Former Defense Minister Hanako Sato)" is attached is brought into correspondence with the meaningful chunk "Minshuto kenren o hihan shi nagara shutsuba hyomei shi ta doto syuin giin no Sato Hanako moto Boeisho ni taishi, (in opposition to former Defense Minister Hanako Sato who is a Lower House member of the Minshu party and who has announced her candidacy while criticizing the prefectural federation of the Minshu party,)." Further, the image to which the caption abstract "Suzuki Ichiro moto Somusho (Former Internal Affairs and Communications Minister Ichiro Suzuki)" is attached is brought into correspondence with the meaningful chunk "zen ken chiji de Somusho mo tsutome ta Suzuki Ichiro shi ga (Mr. Ichiro Suzuki who is a former prefectural governor and also served as a Minister of Ministry of Internal Affairs and Communications)."

As a method of acquiring a meaningful chunk, there are other methods, and for example, there is a method of dividing an article at a position of a period (.) or a comma (,). Further, when there is no image brought into correspondence with a meaningful chunk, it is possible to use a method of continuously bringing an image brought into correspondence with a phrase in another meaningful chunk preceding that meaningful chunk until a phrase having a high correlation with an image is determined the next time.

In Embodiment 2, a correlation with each caption abstract is calculated for each of the phrases of the article body text, and a corresponding image is determined for each of the phrases. However, when an image is brought into correspondence with each of the phrases, there is a case in which the time period for displaying the image becomes extremely short.

In contrast, by performing a dependency analysis, like in the case of Embodiment 3, a relation between a modifying phrase and a modified phrase can be found, and a "meaningful chunk" which includes multiple phrases can be acquired. Therefore, it becomes possible to determine correspondence with an image for a longer sequence of phrases and for a sequence of phrases including less inappropriate meaning.

As mentioned above, the information processing device 10 according to Embodiment 3 is configured to include: a caption abstracting unit 14 generating a caption abstract by abstracting the caption; and a dependency analysis unit 15 dividing the article body text into meaningful chunks by acquiring a dependency relation between the phrases of the article body text. The correspondence determining unit 13 determines correspondence between each of the meaningful chunks of the article body text and the images by calculating a correlation between the caption abstract and each of the meaningful chunks of the article body text. As a result, correspondence between an article body text displayed on the screen or read out and an image displayed on the screen can be determined more correctly. Further, it is possible to avoid the time period for displaying an image becoming extremely short, and consequently, it is possible to improve the visibility.

Although in Embodiment 3, the configuration in which the information processing device 10 includes the caption abstracting unit 14 is shown, the information processing device does not have to include the caption abstracting unit 14. In that case, the correspondence determining unit 13 calculates a correlation between a caption and each of the meaningful chunks of the article body text, thereby determining correspondence between each of the meaningful chunks of the article body text and an image.

Embodiment 4

Figure 16:
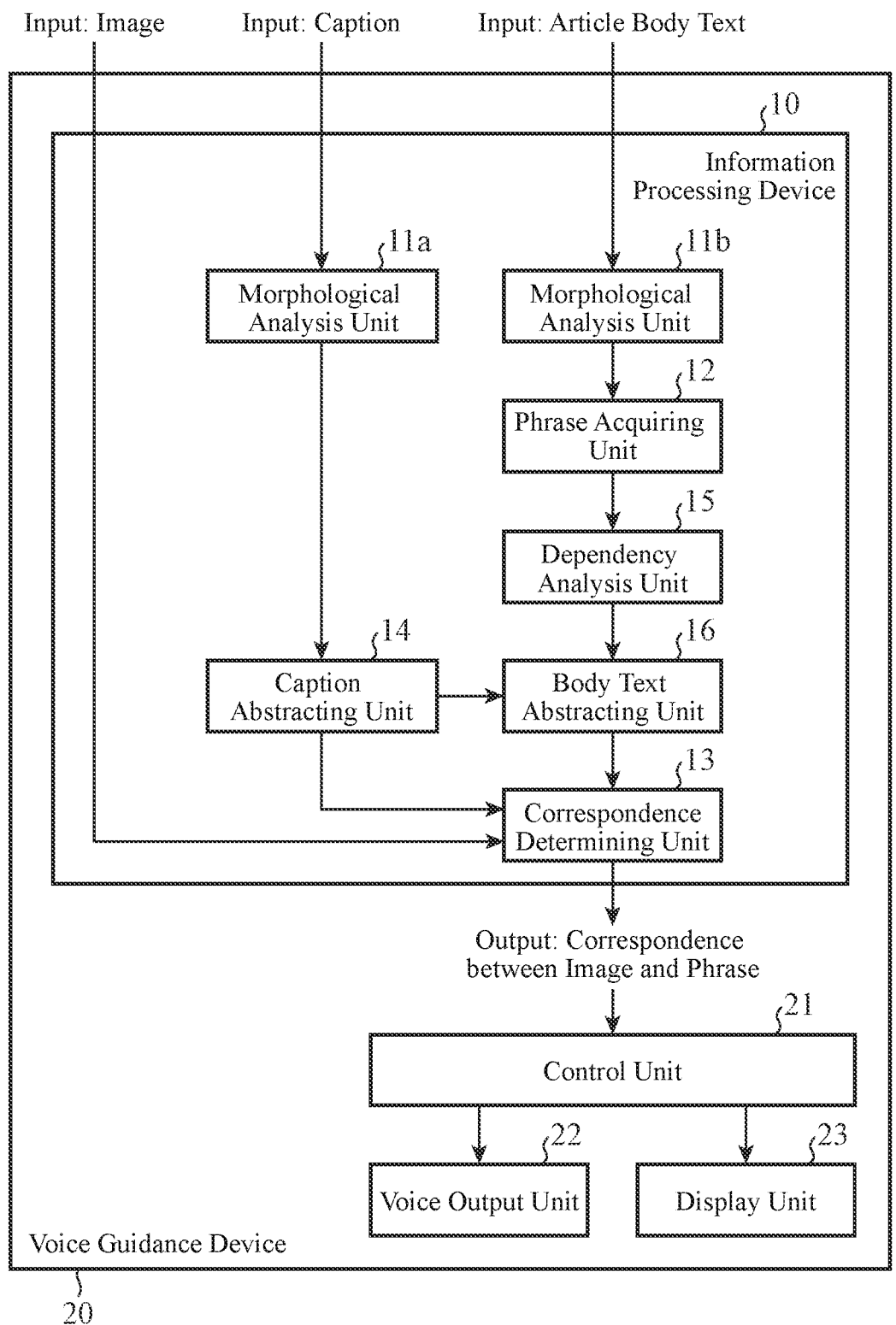
FIG. 16 is a block diagram showing an example of a configuration of a voice guidance device employing an information processing device according to Embodiment 4 of the present invention.

FIG. 16 is a block diagram showing an example of a configuration of a voice guidance device 20 employing an information processing device 10 according to Embodiment 4 of the present invention. The information processing device 10 according to Embodiment 4 has a configuration in which a body text abstracting unit 16 is added to the information processing device 10 of Embodiment 3 shown in FIG. 13. In FIG. 16, the same or corresponding components as those of FIG. 13 are denoted by the same reference signs, and an explanation of the components will be omitted hereafter.

The body text abstracting unit 16 is implemented by the processor 101 shown in FIG. 2 which executes a program stored in the memory 102. As an alternative, the body text abstracting unit 16 is implemented by the processing circuit 107 shown in FIG. 3.

In Embodiments 1 to 3, there is a possibility that when an article body text is abstracted, a part corresponding to an image is not included in the abstract of the article body text because correspondence with an image caption is not taken into consideration. However, because such a part to which an image is attached in an article is considered to be important, it is preferable to include a part corresponding to an image to be displayed in the abstract of the article body text.

FIG. 17 is a flowchart showing operation of the information processing device 10 according to Embodiment 4 of the present invention. Because processes in steps ST1 to ST3, ST5, and ST6 of FIG. 17 are the same as those in steps ST1 to ST3, ST5, and ST6 of FIG. 14, an explanation of the steps will be omitted.

In step ST7 subsequent to step ST6, the body text abstracting unit 16 generates an article body text abstract by abstracting an article body text using the result of a dependency analysis which is acquired by the dependency analysis unit 15.

FIG. 18 is a view showing an example of an article to be processed by the information processing device 10 according to Embodiment 4 of the present invention, and an article body text abstract generated by the body text abstracting unit 16. The bold-faced part of the article body text is the article body text abstract.

There are various methods for abstracting an article body text. For example, the body text abstracting unit 16 calculates the significance degrees of words included in each sentence, defines the sum of the significance degrees of the words included in the sentence as the significance degree of the sentence, and extracts a character string that is within a specified number of characters from a sentence having a higher significance degree. As the significance degree of a word, for example, the TF-IDF value is used. At this time, the body text abstracting unit 16 may be configured to increase the possibility that a sentence having a higher correlation with a caption abstract is included in the article body text abstract, by increasing the significance degree of each of the words included in the caption abstract acquired by the caption abstracting unit 14. According to such a configuration, it becomes possible to make it easy for an article body text abstract which describes the content of an image to be generated.

In step ST4C, from caption abstracts acquired by the caption abstracting unit 14 and the article body text abstract acquired by the body text abstracting unit 16, the correspondence determining unit 13 calculates a correlation between each of the caption abstracts and each of the phrases included in the article body text abstract, thereby determining correspondence between each of the phrases of the article body text abstract and an image.

In the voice guidance device 20 including the body text abstracting unit 16, a sentence which a voice output unit 22 reads out or a display unit 23 displays on the screen may be an article body text or an article body text abstract.

As described above, the information processing device 10 according to Embodiment 4 is configured to include: a caption abstracting unit 14 generating a caption abstract by abstracting the caption; and a body text abstracting unit 16 generating an article body text abstract by abstracting the article body text. The correspondence determining unit 13 determines correspondence between each of the phrases included in the article body text abstract and the images by calculating a correlation between the caption and each of phrases included in the article body text abstract. As a result, even when a caption and an article body text are abstracted, correspondence between the article body text displayed on the screen or read out and an image displayed on the screen can be determined correctly.

Although in Embodiment 4, the configuration in which the information processing device 10 includes the caption abstracting unit 14 is shown, the information processing device does not have to include the caption abstracting unit 14. In such a case, the correspondence determining unit 13 calculates a correlation between a caption and each of the phrases included in the article body text abstract, thereby determining correspondence between each of the phrases of the article body text abstract and an image.

Further, the correspondence determining unit 13 may calculate a correlation between a caption or a caption abstract and each of meaningful chunks included in the article body text abstract, thereby determining correspondence between each of the meaningful chunks of the article body text abstract and an image.

Embodiment 5

Figure 19:
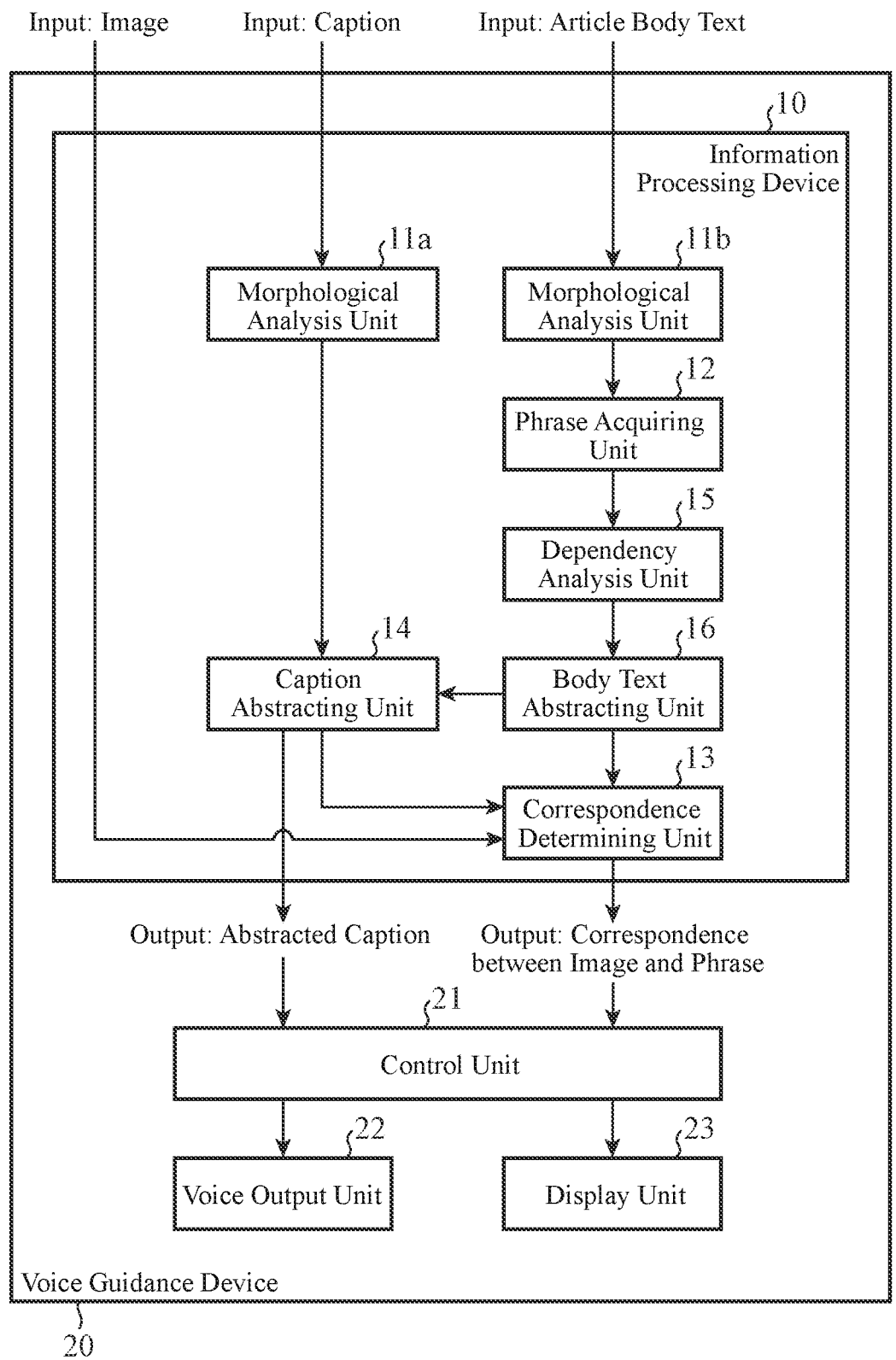
FIG. 19 is a block diagram showing an example of the configuration of a voice guidance device employing an information processing device according to Embodiment 5 of the present invention.

FIG. 19 is a block diagram showing an example of a configuration of a voice guidance device 20 employing an information processing device 10 according to Embodiment 5 of the present invention. While the information processing device 10 according to Embodiment 5 has the same configuration as the information processing device 10 of Embodiment 4 shown in FIG. 16, the information processing device 10 according to Embodiment 5 differs from that of Embodiment 4 in that an arrow is directed from the body text abstracting unit 16 to the caption abstracting unit 14.

Figure 20:
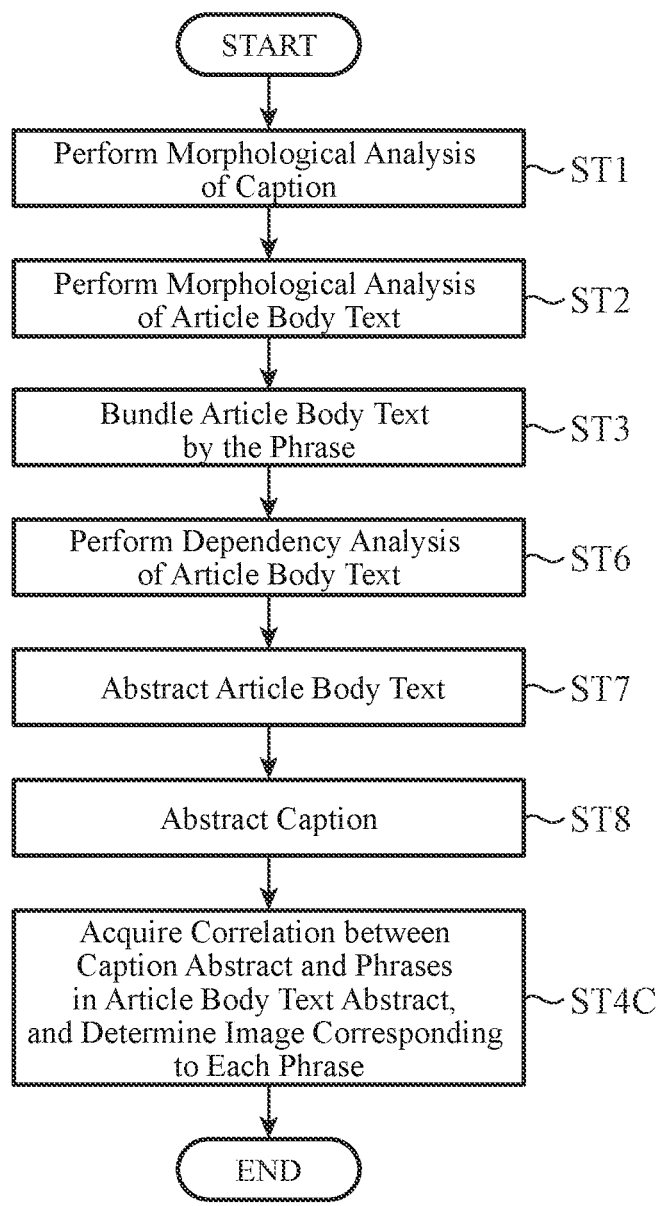
FIG. 20 is a flowchart showing operation of the information processing device according to Embodiment 5 of the present invention.

FIG. 20 is a flowchart showing operation of the information processing device 10 according to Embodiment 5 of the present invention. Because processes in steps ST1 to ST3, ST4C, ST6, and ST7 of FIG. 20 are the same as those in steps ST1 to ST3, ST4C, ST6, and ST7 of FIG. 17, an explanation of the steps will be omitted.

In step ST8 subsequent to step ST7, the caption abstracting unit 14 generates a caption abstract by abstracting the caption using a result of morphological analysis of each caption acquired by a morphological analysis unit 11a, and an article body text abstract acquired by a body text abstracting unit 16. At this time, the caption abstracting unit 14 generates the caption abstract to include the article body text abstract, on the basis of, for example, TF-IDF or the like, like that of Embodiment 4.

As a result, in a case where an area for displaying a caption is small or the like, by increasing the significance degree of each word or phrase included in the article body text abstract, the possibility that the word or phrase is included in a caption abstract is increased, and as a result, correspondence between the article body text abstract currently being read out and an image becomes more correct and easy to recognize.

Further, the caption abstracting unit 14 outputs each caption abstract to a control unit 21. When each of the phrases of the article body text abstract is read out, the control unit controls the display unit 23 to display the image corresponding to the phrase and a caption abstract acquired by the caption abstracting unit 14 together on the screen. The display unit 23 displays the image and the caption abstract under the control of the control unit 21.

As described above, the caption abstracting unit 14 in Embodiment 5 is configured to generate a caption abstract to include an article body text abstract. As a result, even when a caption and an article body text are abstracted, correspondence between the article body text displayed on the screen or read out and an image displayed on the screen can be determined correctly.

In the confirmation of Embodiment 5, the correspondence determining unit 13 determines correspondence between each of the phrases of the article body text abstract and an image by calculating a correlation between a caption abstract and each of the phrases included in the article body text abstract. Alternatively, the correspondence determining unit 13 may be configured to determine correspondence between each of the meaningful chunks of the article body text abstract and an image by calculating a correlation between a caption abstract and each of meaningful chunks included in the article body text abstract.

Further, although in the configuration of Embodiment 5, the display unit 23 displays a caption abstract generated by the caption abstracting unit 14 on the screen, it is not necessarily required to display the caption abstract on the screen.

Further, in Embodiments 2 to 4, the display unit 23 may be configured to display the caption abstract on the screen, like that of Embodiment 5.

Embodiment 6

Figure 21:
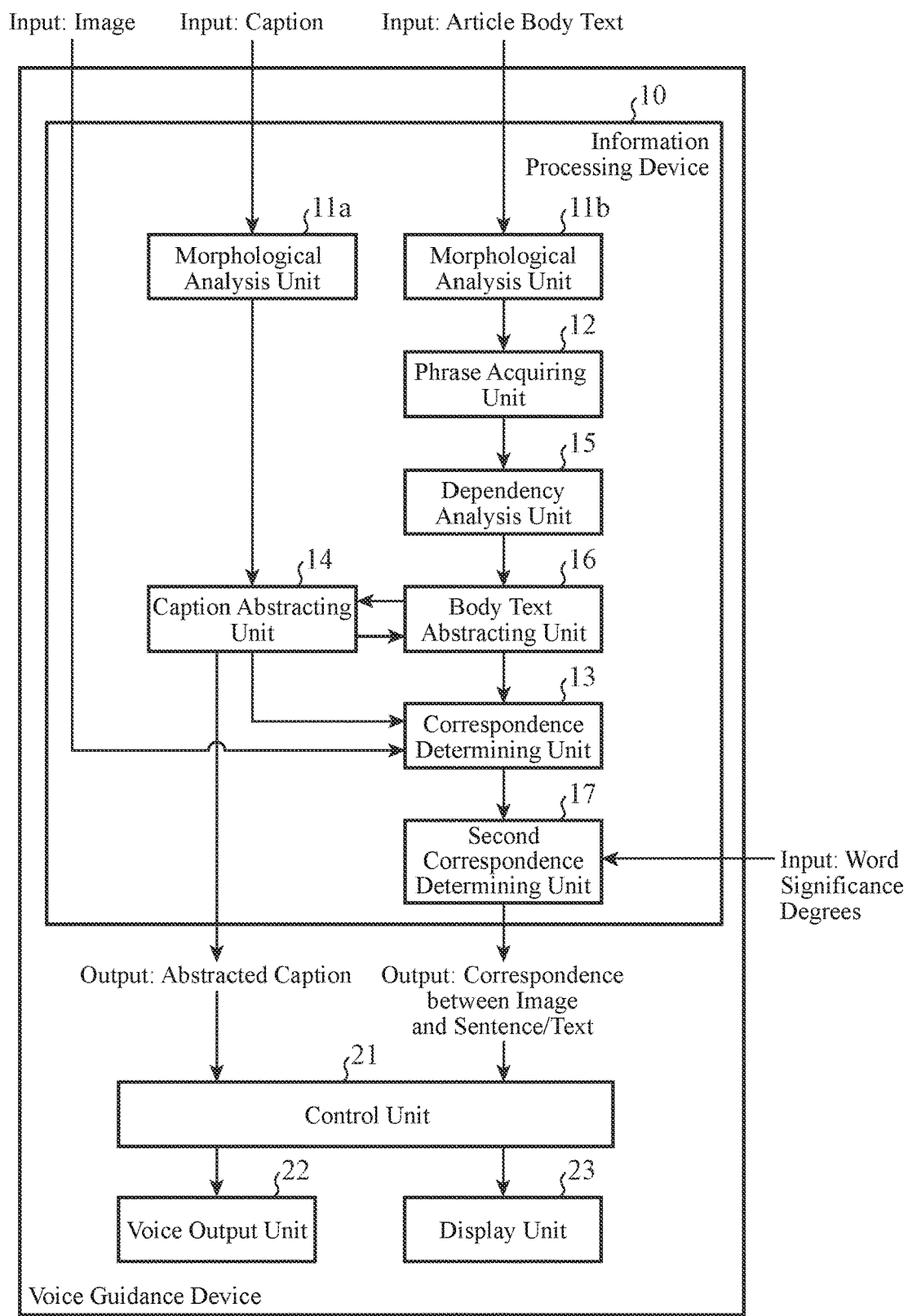
FIG. 21 is a block diagram showing an example of a configuration of a voice guidance device employing an information processing device according to Embodiment 6 of the present invention.

FIG. 21 is a block diagram showing an example of a configuration of a voice guidance device 20 employing an information processing device 10 according to Embodiment 6 of the present invention. The information processing device 10 according to Embodiment 6 has a configuration in which a second correspondence determining unit 17 is added to the information processing device 10 of Embodiment 5 shown in FIG. 19. In FIG. 21, the same or corresponding components as those of FIG. 19 are denoted by the same reference signs, and an explanation of the components will be omitted hereafter. The body text abstracting unit 16 may generate an article body text abstract to include a caption abstract like that of Embodiment 4. As an alternative, the caption abstracting unit 14 may generate a caption abstract to include an article body text abstract like that of Embodiment 5.

The second correspondence determining unit 17 is implemented by the processor 101 shown in FIG. 2 which executes a program stored in the memory 102. As an alternative, the second correspondence determining unit 17 is implemented by the processing circuit 107 shown in FIG. 3.

Because in the configuration in Embodiment 5, correspondence between a phrase or a meaningful chunk and an image is determined. As a result, there is a case in which the frequency of display switching among images is high.

In Embodiment 6, when multiple phrases exist in a single sentence and multiple images correspond to the single sentence, the second correspondence determining unit 17 acquires the significance degree of each of the phrases, and determines, as an image corresponding to the sentence, an image corresponding to a phrase having a higher significance degree. A unit with which an image is brought into correspondence is not limited to a single sentence, and may be a sentence chunk having one or more sentences, such as a paragraph, or may be an article body text abstract generated by abstracting an article body text.

Figures 22, 23:
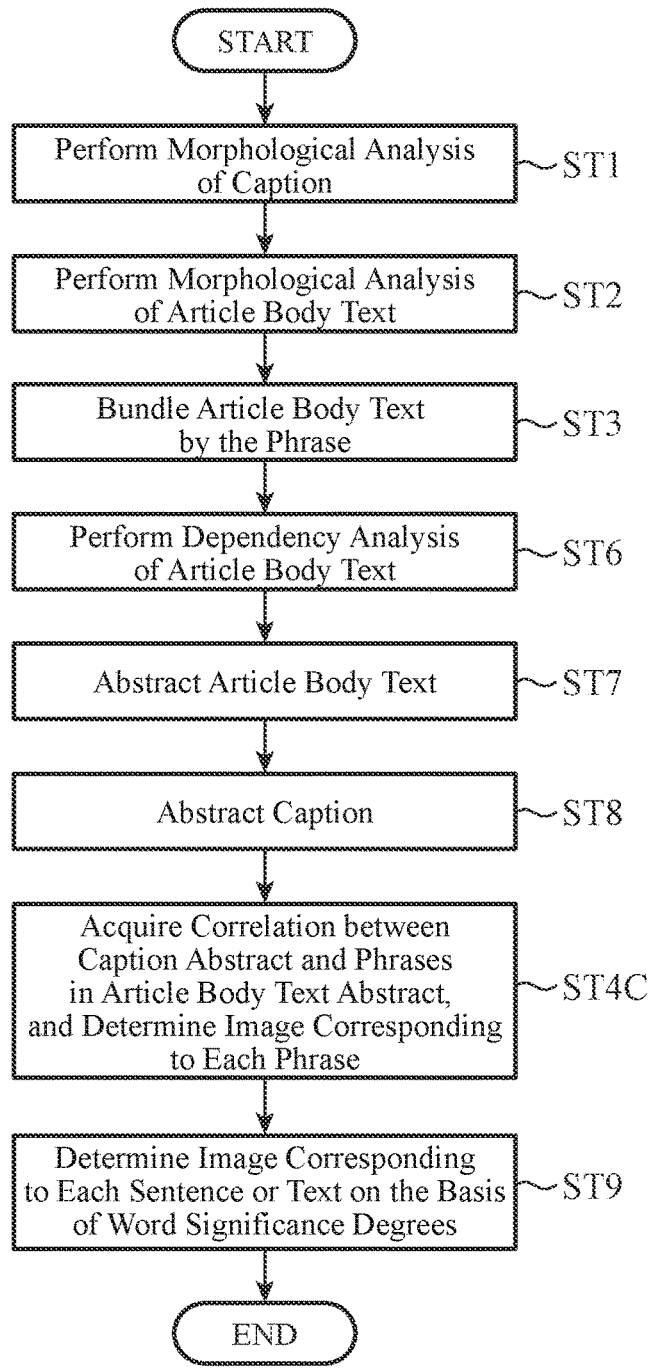
FIG. 22 is a flowchart showing operation of the information processing device according to Embodiment 6 of the present invention.
FIG. 23 is a view showing an example of word significance degree information in the information processing device according to Embodiment 6 of the present invention.

FIG. 22 is a flowchart showing operation of the information processing device 10 according to Embodiment 6 of the present invention. Because processes in steps ST1 to ST8 of FIG. 22 are the same as those in steps ST1 to ST8 of FIG. 20, an explanation of the steps will be omitted.

In step ST9 subsequent to step ST4C, on the basis of correspondence between each of the phrases of the article body text and an image, the correspondence being acquired by a correspondence determining unit 13, the second correspondence determining unit 17 checks whether or not there are multiple images each having correspondence with a sentence chunk including one or more sentences in the article body text. When there are multiple images each having correspondence with such a sentence chunk as mentioned above, the second correspondence determining unit 17 acquires the significance degree of each of the phrases of the article body text on the basis of word significance degree information showing the significance degree of each word. Then, the second correspondence determining unit 17 determines that a single image corresponding to the phrase having the highest significance degree in the above-mentioned sentence chunk is an image having correspondence with the above-mentioned sentence chunk, and outputs the correspondence between the above-mentioned sentence chunk and the single image. On the other hand, when the number of images having correspondence with the above-mentioned sentence chunk is one, the second correspondence determining unit 17 outputs the correspondence between the above-mentioned sentence chunk and that image.

The second correspondence determining unit 17 may acquire the significance degree of each meaningful chunk, instead of acquiring the significance degree of each phrase.

The word significance degree information is, for example, the TF-IDF value. In this case, the second correspondence determining unit 17 calculates the significance degrees of the words included in each phrase or each meaningful chunk, and determines the sum of the significance degrees of the words included in the phrase or the meaningful chunk as the significance degree of the phrase or the meaningful chunk.

Further, the word significance degree information may be determined by other means, for example, by setting the significance degrees of words each included in an article processed in the past to be higher or lower using history information. Moreover, the word significance degree information may be determined, using information generated by acquiring data about voice uttered by a user and in which key words which a user prefers are listed, by setting the significance degrees of words each included as a key word to be higher. Because words each included in an article processed in the past, i.e., words each included in an article which the user viewed frequently in the past are considered to be a content that the user is interested in, by increasing the significance degree of such a word, the possibility that a part in which the user is interested is selected becomes higher. On the other hand, the user may not view only the same articles repeatedly, but may have a desire to read an article having a new content which the user has not seen. In such a case, by decreasing the significance degrees of words each included in an article which was seen frequently in the past, the possibility that words which the user already knows is selected becomes lower, and the possibility that a content which the user does not know yet is selected becomes higher. On the basis of the consideration as described above, the significance degrees of words each included in an article processed in the past may be increased or decreased in accordance with the purpose. As a result, an image appropriate to display for the user can be displayed preferentially.

FIG. 23 is a view showing an example of the word significance degree information in the information processing device 10 according to Embodiment 6 of the present invention. In this word significance degree information, the word significance degree of "Sato Hanako" is determined to be "6", and the word significance degree of "Suzuki Ichiro" is determined to be "2."

For example, a case in which a single image is determined for a single sentence in the article body text shown in FIG. 15 is assumed. The image to which the caption abstract "Sato Hanako moto Boeisho (Former Defense Minister Hanako Sato)" is attached is brought into correspondence with the meaningful chunk "Minshuto kenren o hihan shi nagara shutsuba hyomei shi ta doto syuin giin no Sato Hanako moto Boeisho ni taishi, (in opposition to former Defense Minister Hanako Sato who is a Lower House member of the Minshu party and who has announced her candidacy while criticizing the prefectural federation of the Minshu party,)" by the correspondence determining unit 13. Further, the image to which the caption abstract "Suzuki Ichiro moto Somusho (Former Internal Affairs and Communications Minister Ichiro Suzuki)" is attached is brought into correspondence with the meaningful chunk "zen ken chiji de Somusho mo tsutome ta Suzuki Ichiro shi ga (Mr. Ichiro Suzuki who is a former prefectural governor and also served as a Minister of Internal Affairs and Communications)." Namely, two images are brought into correspondence with the single sentence shown in FIG. 15. At this time, because when the word significance degrees shown in FIG. 23 are used, the significance degree of the meaningful chunk including "Sato Hanako" is higher than that of the meaningful chunk including "Suzuki Ichiro", the image to which the caption "Sato Hanako moto Boeisho (Former Defense Minister Hanako Sato)" is attached is selected as the image corresponding to that single sentence.

As described above, the information processing device 10 according to Embodiment 6 is configured to include a second correspondence determining unit 17, which, when there are multiple images each having correspondence with a sentence chunk including one or more sentences in the article body text, acquires a significance degree of each of phrases of the article body text or a significance degree of each of meaningful chunks of the article body text on a basis of word significance degree information showing a significance degree of each word, and determines an image corresponding to a phrase or a meaningful chunk having a highest significance degree in the sentence chunk, as an image having correspondence with the sentence chunk. As a result, a single image most appropriate to a sentence or text can be determined. Further, it is possible to avoid the time period for displaying an image becoming extremely short, and consequently, it is possible to improve the visibility.

Embodiment 7

Figure 24:
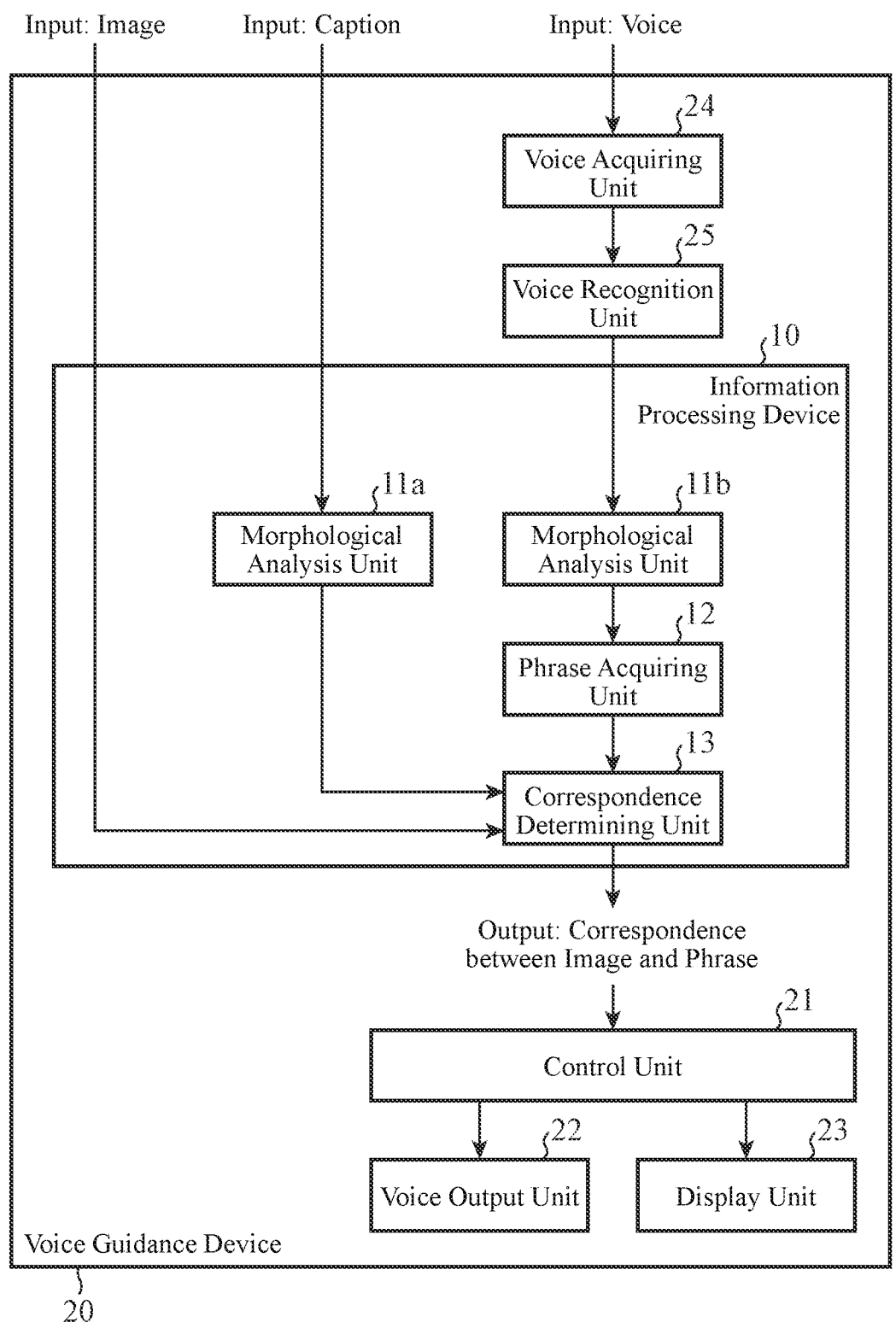
FIG. 24 is a block diagram showing an example of a configuration of a voice guidance device employing an information processing device according to Embodiment 7 of the present invention.

FIG. 24 is a block diagram showing an example of a configuration of a voice guidance device 20 employing an information processing device 10 according to Embodiment 7 of the present invention. The information processing device 10 according to Embodiment 7 has a configuration in which a voice acquiring unit 24 and a voice recognition unit 25 are added to the information processing device 10 of Embodiment 1 shown in FIG. 1. In FIG. 24, the same or corresponding components as those of FIG. 1 are denoted by the same reference signs, and an explanation of the components will be omitted hereafter.

In Embodiment 7, a character string acquired by performing voice recognition of voice data, instead of an article body text, is inputted to the information processing device 10.

Figure 25:
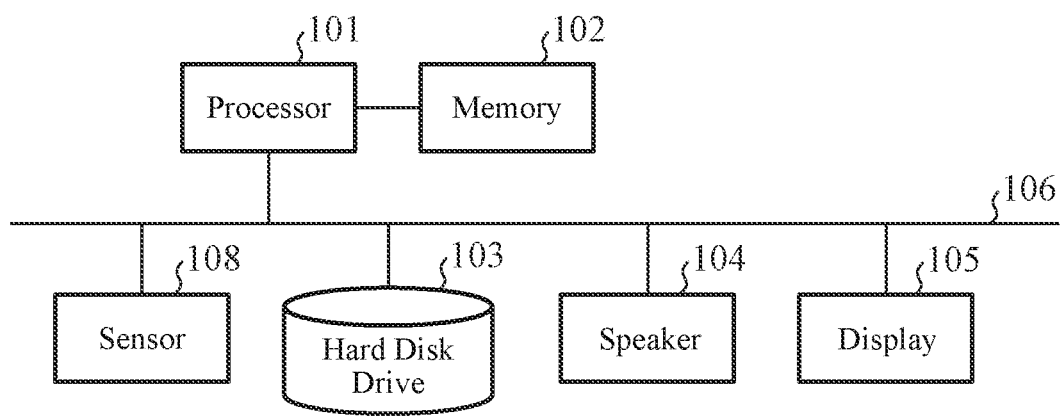
FIG. 25 is a view showing an example of hardware configuration of the voice guidance device employing the information processing device according to Embodiment 7 of the present invention.
Figure 26:
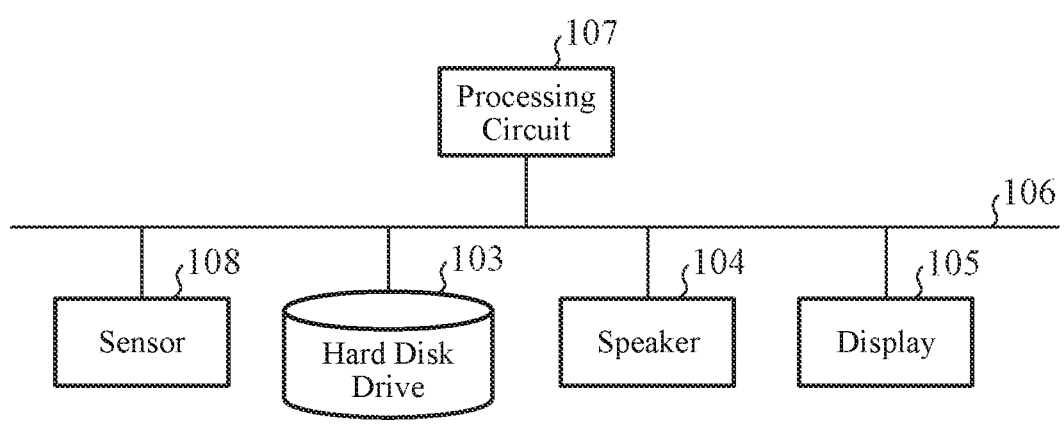
FIG. 26 is a view showing another example of a hardware configuration of the voice guidance device employing the information processing device according to Embodiment 7 of the present invention.

FIGS. 25 and 26 are views showing examples of a hardware configuration of the voice guidance device 20 employing the information processing device 10 according to Embodiment 7 of the present invention. In FIGS. 25 and 26, the same or corresponding components as those of FIG. 2 are denoted by the same reference signs, and an explanation of the components will be omitted hereafter.

In the hardware configuration example shown in FIG. 25, the voice acquiring unit 24 in the information processing device 10 is a sensor 108, such as a microphone, which acquires a sound. The voice recognition unit 25 in the information processing device 10 is implemented by a processor 101 which executes a program stored in the memory 102.

As an alternative, the voice recognition unit 25 can be implemented by the processing circuit 107 which is hardware for dedicated use, as in the case of the hardware configuration example shown in FIG. 26.

The voice guidance device 20 includes the voice acquiring unit 24 that acquires a voice uttered by a user as voice data, and the voice recognition unit 25 that generates a character string by performing voice recognition of the voice data acquired by the voice acquiring unit 24. The character string generated by the voice recognition unit 25 is inputted to the morphological analysis unit 11b of the information processing device 10. The information processing device 10 performs the same process as that on an article body text, on the character string acquired by performing voice recognition of the voice data.

As a result, the voice guidance device 20 can display or emphasize an image corresponding to what the user has uttered. This voice guidance device 20 can be used for presentation or the like. Further, when information equipment is controlled on the basis of a voice recognition result and a button is selected by voice, the voice guidance device 20 can be used for the purpose of highlighting a corresponding button image.

Also in Embodiments 1 to 6, it is possible to provide a configuration in which a character string acquired by voice recognition of voice data, instead of an article body text, is inputted to the information processing device 10.

Further, in the configuration of each of Embodiments 1 to 7, the morphological analysis unit 11a performs morphological analysis of a caption, and the morphological analysis unit 11b performs morphological analysis of an article body text. Alternatively, a configuration in which a single morphological analysis unit performs morphological analysis of both a caption and an article body text can be provided.

Further, although in Embodiments 1 to 7, the information processing device 10 and the voice guidance device 20 which are targeted for Japanese are explained, the target language of the information processing device 10 and the voice guidance device 20 is not limited to Japanese.

Further, in the configuration of each of Embodiments 1 to 7, the information processing device 10 is used for the voice guidance device 20 that reads out an article body text. Alternatively, a configuration in which the information processing device 10 is used for an information presenting device that displays an article body text on a screen can be provided.

Further, in the configuration of each of Embodiments 1 to 7, the voice guidance device 20 includes the information processing device 10 therein. Alternatively, the information processing device 10 can be configured separately from the voice guidance device 20 and can be connected to the voice guidance device 20 to be able to transmit information to and receive information from each other.

Other than the configurations described above, any combination of the above-described embodiments can be made, various modification in any component of each of the embodiments can be made, and any component of each of the embodiments can be omitted within the scope of the invention.

Industrial Applicability

Because the information processing device according to the present invention correctly determines correspondence between an article body text displayed on a screen or read out and an image displayed on the screen, it is suitable for use in an information presenting device that displays information on a screen and a voice guidance device that reads out information, these devices including a car navigation system, a display in an elevator, signage, a smartphone, and a device that reads out a television program schedule, and so on.

Reference Signs List 10 information processing device, 11a morphological analysis unit, 11b morphological analysis unit, 12 phrase acquiring unit, 13 correspondence determining unit, 14 caption abstracting unit, 15 dependency analysis unit, 16 body text abstracting unit, 17 second correspondence determining unit, 20 voice guidance device, 21 control unit, 22 voice output unit, 23 display unit, 24 voice acquiring unit, 25 voice recognition unit, 101 processor, 102 memory, 103 hard disk drive, 104 speaker, 105 display, 106 bus, 107 processing circuit, and 108 sensor.

The invention claimed is:

1. An information processing device comprising:
a processor to execute a program; and
a memory to store the program which, when executed by the processor, performs processes of,
  performing morphological analysis to divide each of an article body text included in an article and a caption of each of images into morphemes;
  dividing the article body text into phrases on a basis of a result of the morphological analysis;
  generating a caption abstract by abstracting the caption; and
  determining correspondence between each of the phrases of the article body text and the images by calculating a correlation between the caption abstract and each of the phrases of the article body text on a basis of the result of the morphological analysis.

2. An information processing device comprising:
a processor to execute a program; and
a memory to store the program which, when executed by the processor, performs processes of,
  performing morphological analysis to divide each of an article body text included in an article and a caption of each of images into morphemes;
  dividing the article body text into phrases on a basis of a result of the morphological analysis;
  dividing the article body text into meaningful chunks by acquiring a dependency relation between the phrases of the article body text; and
  determining correspondence between each of the meaningful chunks of the article body text and the images by calculating a correlation between the caption and each of the meaningful chunks of the article body text.

3. The information processing device according to claim 2, wherein the program, when executed by the processor, further performs processes of:
  generating a caption abstract by abstracting the caption; and
  determining correspondence between each of the meaningful chunks of the article body text and the images by calculating a correlation between the caption abstract and each of the meaningful chunks of the article body text.

4. An information processing device comprising:
a processor to execute a program; and
a memory to store the program which, when executed by the processor, performs processes of,
  performing morphological analysis to divide each of an article body text included in an article and a caption of each of images into morphemes;
  dividing the article body text into phrases on a basis of a result of the morphological analysis;
  generating an article body text abstract by abstracting the article body text;
  generating a caption abstract by abstracting the caption; and determining correspondence between each of the phrases included in the article body text abstract and the image by calculating a correlation between the caption abstract and each of the phrases included in the article body text abstract on a basis of the result of the morphological analysis.

5. The information processing device according to claim 4, wherein the caption abstract is generated to include the article body text abstract.

6. An information processing device comprising:
a processor to execute a program; and
a memory to store the program which, when executed by the processor, performs processes of,
performing morphological analysis to divide each of an article body text included in an article and a caption of each of images into morphemes;
dividing the article body text into phrases on a basis of a result of the morphological analysis; and
determining correspondence between each of the phrases of the article body text and the images by calculating a correlation between the caption and each of the phrases of the article body text on a basis of the result of the morphological analysis; and
when there are multiple images each having correspondence with a sentence chunk including one or more sentences in the article body text, acquiring a significance degree of each of phrases of the article body text or a significance degree of each of meaningful chunks of the article body text on a basis of word significance degree information showing a significance degree of each word, and determining an image corresponding to a phrase or a meaningful chunk having a highest significance degree in the sentence chunk, as an image having correspondence with the sentence chunk.

* * * * *